(12) United States Patent
Yamaguchi et al.

(10) Patent No.: US 7,372,223 B2
(45) Date of Patent: May 13, 2008

(54) ELECTRIC DRIVE CONTROL APPARATUS AND METHOD

(75) Inventors: Yasuo Yamaguchi, Anjo (JP); Yasuhiko Kobayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 209 days.

(21) Appl. No.: 10/902,184

(22) Filed: Jul. 30, 2004

(65) Prior Publication Data

US 2005/0035675 A1  Feb. 17, 2005

(30) Foreign Application Priority Data

Aug. 12, 2003 (JP) .............................. 2003-207388

(51) Int. Cl.
*H02P 6/16* (2006.01)
*G01P 3/00* (2006.01)

(52) U.S. Cl. ...................... 318/254; 318/439; 318/605; 318/653; 310/68 B; 324/207.25

(58) Field of Classification Search ..................... None
See application file for complete search history.

(56) References Cited

U.S. PATENT DOCUMENTS

| | | | | |
|---|---|---|---|---|
| 4,631,510 A | * | 12/1986 | Nagarkatti et al. | 310/168 |
| 5,025,201 A | * | 6/1991 | Berger | 318/605 |
| 5,444,340 A | | 8/1995 | Tamaki et al. | |
| 5,850,130 A | * | 12/1998 | Fujisaki et al. | 318/439 |
| 5,990,657 A | * | 11/1999 | Masaki et al. | 318/811 |
| 6,260,644 B1 | * | 7/2001 | Otsu | 180/65.3 |
| 6,340,339 B1 | | 1/2002 | Tabata et al. | |
| 6,456,030 B1 | * | 9/2002 | Masaki et al. | 318/700 |
| 7,009,385 B2 | * | 3/2006 | Kobayashi et al. | 318/653 |
| 7,012,389 B2 | * | 3/2006 | Kobayashi et al. | 318/254 |
| 2004/0007926 A1 | * | 1/2004 | Tsukada | 310/68 B |
| 2004/0027757 A1 | * | 2/2004 | Minatani | 361/91.1 |
| 2004/0232862 A1 | * | 11/2004 | Wogari et al. | 318/254 |
| 2006/0125439 A1 | * | 6/2006 | Ajima et al. | 318/716 |

FOREIGN PATENT DOCUMENTS

| | | |
|---|---|---|
| DE | 199 54 325 A1 | 6/2001 |
| JP | A-61-180311 | 8/1986 |
| JP | A-63-094114 | 4/1988 |
| JP | 05252711 A * | 9/1993 |
| JP | A-11-337372 | 12/1999 |
| JP | A-2000-94972 | 4/2000 |
| JP | A-2001-124591 | 5/2001 |
| JP | 2002168652 A * | 6/2002 |
| JP | A 2002-369570 | 12/2002 |
| JP | 2005055183 A * | 3/2005 |

* cited by examiner

*Primary Examiner*—Lincoln Donovan
*Assistant Examiner*—Eduardo Colon
(74) *Attorney, Agent, or Firm*—Oliff & Berridge, PLC

(57) ABSTRACT

An electric drive apparatus has an electric motor having a rotor and a stator; and a magnetic pole position detecting portion having a sensor rotor attached to the rotor, and a sensor stator that is adjacent to the stator, and that is fixed to a case, and that extends over a partial region of the sensor rotor extending in a circumferential direction. Because the sensor rotor of the magnetic pole position detecting portion is attached to the rotor and the sensor stator is adjacent to the stator and is fixed to the case, it is no longer necessary to use an all-round embracing type magnetic pole position detecting portion that embraces the entire shaft of an electric machine.

13 Claims, 13 Drawing Sheets

ELECTRIC DRIVE CONTROL APPARATUS AND METHOD

CROSS-REFERENCE TO RELATED APPLICATION

The disclosure of Japanese Patent Application No. 2003-207388 filed on Aug. 12, 2003 including the specification, drawings and abstract is incorporated herein by reference in its entirety.

BACKGROUND OF THE INVENTION

1. Field of Invention

The invention relates to an electric drive apparatus, an electric drive control apparatus, and an electric drive control method.

2. Description of Related Art

In a related-art apparatus, an electric drive apparatus is mounted in an electric motor vehicle, which is an electric drive vehicle, so as to cause generation of torque of an electric motor that acts as an electric machine, that is, motor torque, and transfers the motor torque to driving wheels. The electric motor receives direct current from the battery, and is therefore driven to generate the motor torque during powering (driving). During regenerative operation (power generation), the electric motor receives torque due to the inertia of the electric motor vehicle, and therefore generates direct current and supplies the current to a battery.

Furthermore, in an electric drive apparatus which is mounted in a hybrid vehicle, as an electric drive vehicle, and in which an electric motor is coupled directly to a crankshaft of the engine, the electric motor is driven to start the engine, and the motor torque is transferred to the driving wheels.

Such an electric drive apparatus is equipped with, for example, an inverter for driving the electric motor, a motor control apparatus as an electric machine control apparatus, etc. When supplying current from a battery to the electric motor so as to drive the electric motor and therefore cause the electric motor vehicle or hybrid vehicle or the like to run, the motor control apparatus detects the position of the rotor of the electric motor, that is, the magnetic pole position, and generates a pulse width modulation signal corresponding to the magnetic pole position, and sends the pulse width modulation signal to the inverter, so that the inverter generates U-phase, V-phase and W-phase currents.

Normally, the detection of the magnetic pole position is accomplished through the use of an all-round embracing type resolver that is disposed on a shaft of the electric motor and embraces the entire shaft. However, if the resolver is disposed near the motor shaft, the size of the electric drive apparatus correspondingly increases.

Therefore, a low-resolution pulse generating type sensor is disposed near an outer peripheral surface of the rotor, and is used to detect the magnetic pole position. In this case, the detection of the magnetic pole position can be accomplished merely by disposing the sensor, so that the electric drive apparatus can be considerably reduced in size (see, for example, Japanese Patent Application Laid-Open Publication No. 2002-369570).

SUMMARY OF THE INVENTION

However, in the electric drive apparatus employing a low-resolution pulse generating-type sensor in accordance with the related art, if the rotation speed of the electric motor, that is, the motor rotation speed, is low, it becomes difficult to detect the magnetic pole position, so that sufficient motor torque cannot be generated. The employment of an electric motor of high rating is conceivable as a countermeasure, but increases the cost of the electric drive apparatus.

It is an object of the invention to solve, at least, the aforementioned problems of the related-art electric drive apparatus and provide an electric drive apparatus, an electric drive control apparatus and an electric drive control method that allow a reduction in the apparatus size, and that are capable of generating sufficient torque while reducing the cost.

According to an exemplary embodiment, an electric drive apparatus includes an electric motor having a rotor and a stator; and a magnetic pole position detecting portion having a sensor rotor attached to the rotor, and a sensor stator that is adjacent to the stator, and that is fixed to a case, and that extends over a partial region of the sensor rotor extending in a circumferential direction.

As for the magnetic pole position detecting portion of the apparatus, the sensor rotor is attached to the rotor and the sensor stator is adjacent to the stator and is fixed to the case. Therefore, it is no longer necessary to employ an all-round embracing type magnetic pole position detecting portion that embraces an entire shaft of an electric machine. Hence, the electric drive apparatus can be reduced in size.

Furthermore, the electric drive apparatus is able to generate a detection signal on the basis of a sensor output of the magnetic pole position detecting portion even if the electric machine rotation speed is low. Therefore, the magnetic pole position can be detected on the basis of the detection signal, and sufficient electric machine torque can be generated.

Furthermore, because it is unnecessary to use an electric machine of high rating, the cost of the electric drive apparatus can be reduced.

In the electric drive apparatus, the sensor stator may include an attaching portion for attaching the sensor stator to the case, and a wire-wound portion that is located radially inward of an inner peripheral surface of the case, and that protrudes from an inner peripheral edge-adjacent portion of the attaching portion in two opposite circumferential directions. In this structure, the wire-wound portion protrudes from an inner peripheral edge-adjacent portion of the attaching portion in two opposite circumferential directions, so that a sufficient quantity of sensor coils can be provided on the wire-wound portion. Therefore, the magnetic pole position can be detected with further improved accuracy.

An electric drive control apparatus includes a magnetic pole position detecting portion; a signal converter that generates a detection signal based on a sensor output of the magnetic pole position detecting portion; rotation speed computation process means for computing an electric machine rotation speed based on the detection signal; magnetic pole position computation process means for computing a magnetic pole position based on the detection signal; and phase switching process means for performing phase switching for computing the magnetic pole position based on the electric machine rotation speed and a phase switch rotation speed.

In this electric drive control apparatus, the phase switching process means performs the phase switching for computing the magnetic pole position based on the electric machine rotation speed and the phase switch rotation speed, so that the magnetic pole position can easily be detected with good accuracy regardless of whether the electric machine rotation speed is high, or is low as in the case of startup of the electric machine. Therefore, sufficient electric machine torque can be generated.

The electric drive control apparatus may further include acceleration computation process means for computing an electric machine acceleration based on the electric machine rotation speed. In this structure, the phase switching process means sets the phase switch rotation speed corresponding to the electric machine acceleration. Because the phase switching process means sets the phase switch rotation speed corresponding to the electric machine acceleration, the phase switching can be performed with good accuracy. Therefore, the magnetic pole position can be detected with further improved ease and accuracy. As a result, ample electric machine torque can be generated.

The electric drive control apparatus may also include clock switching process means for switching a clock for switching a resolving power based on the electric machine rotation speed. In this structure, the phase switching process means performs the phase switching in conjunction with switching of the clock. Because the phase switching process means performs the phase switching in conjunction with the switching of the clock, it becomes possible to curb fluctuations that occur in the electric machine rotation speed and the magnetic pole position in conjunction with the switching of the resolving power of the timer. Therefore, the electric machine torque can be stably generated.

The electric drive control apparatus may further include magnetic pole position determination process means for determining whether the magnetic pole position is within a predetermined range, and edge detection prohibition process means for prohibiting detection of an edge in the detection signal if the magnetic pole position is within the predetermined range. Because the edge detection prohibition process means prohibits the detection of an edge in the detection signal if the magnetic pole position is within the predetermined range, normal electric machine rotation speed can be computed.

BRIEF DESCRIPTION OF THE DRAWINGS

The invention will be described with reference to the drawings, in which.

DETAILED DESCRIPTION OF PREFERRED EMBODIMENTS

Figure 1:
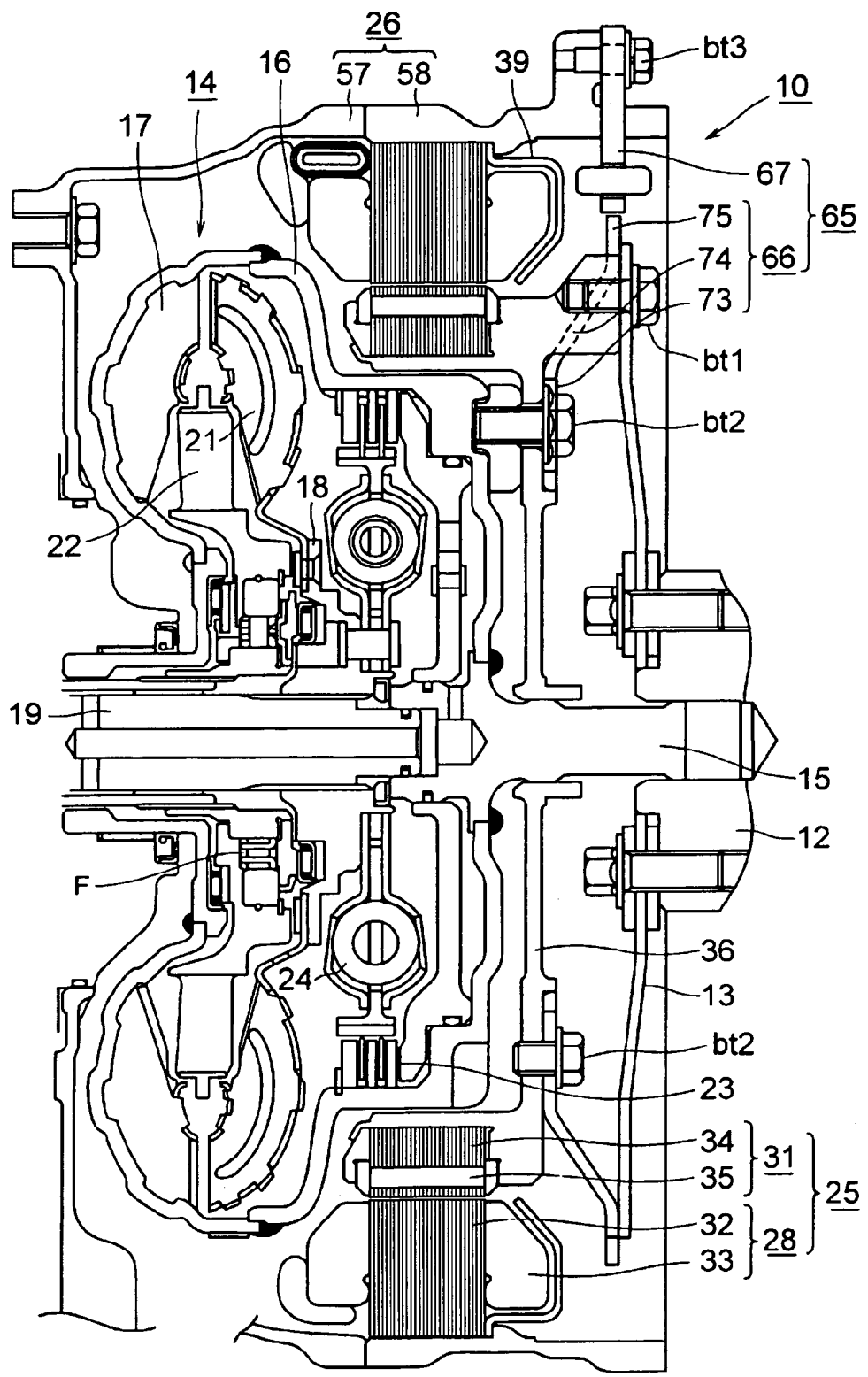
FIG. 1 is a sectional view of main portions of an electric drive apparatus according to a first exemplary embodiment.

Description will be made in conjunction with a hybrid vehicle as an electric drive vehicle. In the drawings, reference numeral 10 denotes an electric drive apparatus; reference numeral 12 denotes a crankshaft as an output of an engine 11; reference numeral 13 denotes a drive plate; reference numeral 14 denotes a torque converter as a fluid transmission apparatus; reference numeral 25 denotes an electric motor as a generator-motor that has the functions of a generator and a motor; and reference numeral 26 denotes an electric drive apparatus case. The torque converter 14 includes a center piece 15, a front cover 16 connected to the center piece 15, a pump impellor 17 connected to the front cover 16, a turbine runner 21 that faces the pump impellor 17, that forms a torus together with the pump impellor 17, and that is connected to an input shaft 19 of a speed change apparatus 41 via a turbine hub 18, a stator 22, a lockup clutch device 23 disposed so as to be engageable and disengageable, and a damper device 24 that absorbs fluctuations in the torque transferred via the torque converter 14, that is, fluctuations in transfer torque. The electric drive apparatus case 26 includes a torque converter case 57 as a first case containing the torque converter 14, a motor case 58 as a second case containing the electric motor 25, a speed change apparatus case (not shown) as a third case containing the speed change apparatus 41, etc.

The rotation transferred from the engine to the torque converter 14 is transferred to the front cover 16 via the crankshaft 12, and then is transferred to the pump impellor 17 fixed to the front cover 16. As the pump impellor 17 rotates, oil within the torus flows round a shaft of the torque converter 14, and, due to centrifugal force, circulates among the pump impellor 17, the turbine runner 21 and the stator 22, thereby rotating the turbine runner 21. Thus, rotation is transferred to the input shaft 19.

If the pump impellor 17 has just started rotating, and therefore there is a great difference in rotation speed between the pump impellor 17 and the turbine runner 21 as in the case of a launch of the hybrid vehicle, the oil flowing out of the turbine runner 21 flows in such a direction as to impede the rotation of the pump impellor 17. Therefore the stator 22 is disposed between the pump impellor 17 and the turbine runner 21. If the rotation speed difference between the pump impellor 17 and the turbine runner 21 is great, the stator 22 changes the direction of flow to a direction that assists the rotation of the pump impellor 17.

As the rotation speed of the turbine runner 21 increases, and therefore the rotation speed difference between the pump impellor 17 and the turbine runner 21 reduces, the oil, which has been striking the obverse side of the blades of the stator 22, comes to strike the reverse side of the blades, so that the flow of oil is impeded. Therefore, in order to allow the stator 22 to rotate only in one direction, a one-way clutch F is disposed at an inner periphery side of the stator 22. Hence, as the oil comes to strike the reverse side of the blades, the stator 22 comes to naturally rotate due to the one-way clutch F, so that the oil smoothly circulates. Then, when a pre-set vehicle speed is achieved after the hybrid vehicle has taken off, the lockup clutch device 23 is engaged, so that the rotation of the engine is directly transferred to the input shaft 19, without the need for the operation of the oil.

The electric motor 25 includes a stator 28 fixed to the motor case 58, and a rotor 31 that is provided radially inwardly of the stator 28, that is attached to the center piece 15, that is disposed rotatably, and that is connected to the crankshaft 12. Radially outwardly of the rotor 31, the stator 28 is provided with a stator core 32, and coils 33 wound on the stator core 32. The rotor 31 is provided with a rotor core 34, and permanent magnets 35 disposed at a plurality of sites on the rotor core 34 which are spaced in the direction of a circumference of the rotor core 34.

The rotor 31 is centered at the center piece 15 via a rotor hub 36. The rotor hub 36 is connected to the front cover 16, and is also connected to a drive plate 13. The drive plate 13 is fastened to the rotor hub 36 via bolts bt1 as fastening members provided near an outer peripheral edge of the drive plate 13.

In order to detect the magnetic pole position θ of the rotor 31, a resolver 65, as a magnetic pole position detector portion, is disposed at a position near an outer periphery of the rotor 31 and adjacent to the stator 28. The resolver 65 has a sensor rotor 66 as a first detection element that is connected to the rotor 31 via bolts bt2 as fastening members that fasten the sensor rotor 66 to the rotor hub 36, and a sensor stator 67 as a second detection element that is disposed adjacent to the stator 28, and that is fastened to the motor case 58 by a bolt bt3 as a fastening member, and that extends over a limited region of the sensor rotor 66 in the direction of a circumference of the sensor rotor 66.

Because the rotor hub 36 is disposed near the front cover 16, the sensor rotor 66 is attached to the rotor hub 36 at a site near the front cover 16. In a space radially outward of a portion of the sensor rotor 66 attached to the rotor hub 36, that is, a sensor rotor-attached portion, the coils 33 are protruded toward the engine 11-side. Therefore, to be clear of the coils 33, the sensor stator 67 must be fastened to a portion of the motor case 58 which is forward (rightward in FIG. 1) of the sensor rotor-attached portion. Hence, the sensor rotor 66 has an annular structure formed by eccentric and coaxial annular portions. That is, the sensor rotor 66 has an annular flat portion 73 that extends in the radial direction, an annular inclined portion 74 that extends diagonally forward and radially outward from an outer peripheral portion of the flat portion 73, and an annular flat portion 75 that extends in the radial direction from an outer peripheral portion of the inclined portion 74. If splashes of an oil for cooling the electric motor 25 or the like are deposited on the resolver 65, the accuracy in detection of the magnetic pole position θ deteriorates. Therefore, a cover 39 that covers the coils 33 is disposed at a forward end side (rightward end side in FIG. 1) of the coils 33.

Figure 3:
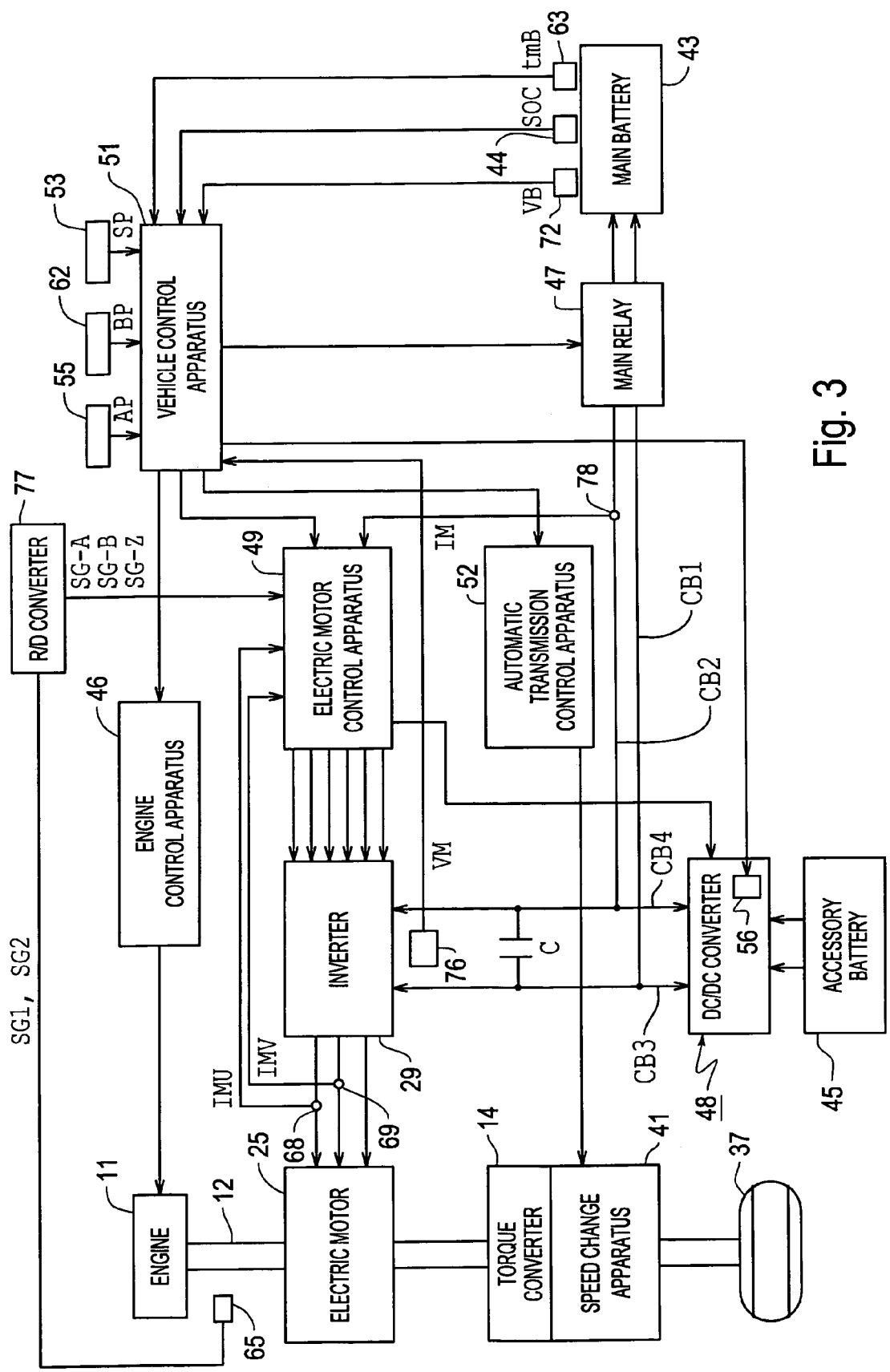
FIG. 3 is a block diagram of an electric drive control apparatus in the first exemplary embodiment.

Next, an electric drive control apparatus for controlling the electric drive apparatus 10 will be described. In FIG. 3, reference numeral 29 denotes an inverter for driving the electric motor 25; reference numeral 37 denotes a driving wheel; reference numeral 41 is the speed change apparatus that is connected to the torque converter 14 and that changes the speed of rotation output from the torque converter 14 at predetermined shift speeds; reference numeral 43 denotes a main battery as a first battery that serves as an electric power supply for driving the hybrid vehicle; and reference numeral 45 denotes an auxiliary battery as a second battery that serves as an electric power supply for operating accessories of the hybrid vehicle. The inverter 29 is connected to the main battery 43 via direct-current cables CB1, CB2 and a main relay 47 as a relay, so that direct current is supplied to the inverter 29 from the main battery 43. The main battery 43 is connected to a DC/DC converter 48 via the main relay 47, the direct-current cables CB1, CB2, and direct-current cables CB3, CB4 branching from the direct-current cables CB1, CB2. The DC/DC converter 48 is connected to the auxiliary battery 45.

In this embodiment, the voltage of the main battery 43 as a first power supply voltage is 42 V, and the voltage of the auxiliary battery 45 as a second power supply voltage is 12 V. The DC/DC converter 48 transforms the voltage of 42 V into the voltage of 12 V, and also transforms the voltage of 12 V into the voltage of 42 V. A switch 56 is disposed within the DC/DC converter 48. By turning the switch 56 on and off, the DC/DC converter 48 can be activated and the operation of the DC/DC converter 48 can be stopped.

At an inlet side of the inverter 29, a motor inverter voltage sensor 76 as a DC voltage detecting portion is disposed for detecting the direct-current voltage applied to the inverter 29, that is, the motor inverter voltage VM. At a predetermined side of the direct-current cable CB2, a motor inverter current sensor 78 as a DC detecting portion is disposed for detecting the DC current supplied to the inverter 29, that is, the motor inverter current IM. The motor inverter voltage VM is supplied to a vehicle control apparatus 51, and the motor inverter current IM is supplied to an electric motor control apparatus 49. A smoothing capacitor C is connected between the inverter 29 and the main battery 43.

The vehicle control apparatus 51 includes a CPU, a recording device, etc. (not shown), and performs overall control of a vehicle drive apparatus, and functions as a computer on the basis of predetermined programs, data, etc. The vehicle control apparatus 51 is connected to an engine control apparatus 46, the electric motor control apparatus 49, and an automatic transmission control apparatus 52. The engine control apparatus 46 includes a CPU, a recording device, etc. (not shown), and sends command signals regarding the degree η of throttle opening, the valve timing, etc. to the engine 1, in order to control the engine 1. The electric motor control apparatus 49 includes a CPU, a recording device, etc. (not shown), and sends a drive signal to the inverter 29 in order to control the electric motor 25. The automatic transmission control apparatus 52 includes a CPU, a recording device, etc. (not shown), and sends various signals, such as a solenoid signal and the like, to the speed change apparatus 41 in order to control the automatic transmission. It is to be noted herein that the engine control apparatus 46, the electric motor control apparatus 49 and the automatic transmission control apparatus 52 form a first control apparatus, and that the vehicle control apparatus 51 forms a second control apparatus that is at a level above the first control apparatus. Furthermore, the engine control apparatus 46, the electric motor control apparatus 49 and the automatic transmission control apparatus 52 function as computers on the basis of predetermined programs, data, etc., as is the case with the vehicle control apparatus 51.

The inverter 29 is driven in accordance with the drive signal. During powering, the inverter 29 receives DC current from the main battery 43 to generate currents IMU, IMV, IMW in the three phases, and supplies the currents IMU, IMV, IMW in the phases to the electric motor 25. During regeneration, the inverter 29 receives currents IMU, MV, IMW in the three phases from the electric motor 25 to generate a DC current, and supplies the DC current to the main battery 43.

In FIG. 3, reference numeral 44 denotes a remaining battery charge detector device for detecting the state of the main battery 43, that is, the amount of charge remaining in the battery SOC as a state of the battery; reference numeral 53 denotes a shift position sensor for detecting the position of a shift lever (not shown) provided as a shift operating portion, that is, the shift position SP; reference numeral 55 denotes an accelerator switch as an accelerator operation detecting portion and an engine load detecting portion for detecting the position of an accelerator pedal (not shown) (amount of depression of the accelerator pedal), that is, the accelerator pedal position AP; reference numeral 62 denotes a brake switch as a brake operation detecting portion for detecting the position of a brake pedal (not shown) (amount of depression of the brake pedal), that is, the brake pedal position BP; reference numeral 63 denotes a battery temperature sensor as a temperature detecting portion for detecting the temperature tmB of the main battery 43; reference numeral 65 denotes a resolver; and reference numeral 77 denotes an R/D converter (resolver/digital converter) as a signal converter for generating a detection signal indicating a magnetic pole position θ upon receiving a sensor output of the resolver 65. The accelerator pedal position AP indicates the load on the engine 11, that is, the engine load.

Furthermore, reference numerals 68, 69 denote electric current sensors as AC current detecting portions for detecting the currents IMU, IMV in two phases; and reference numeral 72 denotes a battery voltage sensor as a voltage detecting portion for the main battery 43 which detects a battery voltage VB as the state of the battery. The battery voltage VB is sent to the vehicle control apparatus 51. As for the state of the battery, it is also possible to detect a battery current, a battery temperature, etc. A battery state detecting portion is formed by the remaining battery charge detector device 44, the battery voltage sensor 72, a battery current sensor (not shown), a battery temperature sensor (not shown), etc. The currents IMU, IMV are sent to the electric motor control apparatus 49 and the vehicle control apparatus 51.

The vehicle control apparatus 51 sends an engine control signal to the engine control apparatus 46, so that the driving or stopping of the engine 11 is set by the engine control apparatus 46. The electric motor control apparatus 49 inputs a detection signal from the RID converter 77, and computes the magnetic pole position θ on the basis of the detection signal. Furthermore, a vehicle speed computation process means (not shown) of the vehicle control apparatus 51 executes a vehicle speed computation process, that is, computes a rate of change Δθ in the magnetic pole position θ, and computes the vehicle speed V on the basis of the rate of change Δθ and the gear ratio of a torque transfer line from the center piece 15 to the driving wheels 37.

The vehicle control apparatus 51 sets a target engine rotation speed NE* that indicates a target value of the engine rotation speed NE, that is, the rotation speed of the engine 11, and also sets a target motor torque TM* that indicates a target value of the motor torque TM. Although, in this embodiment, the electric motor 25 is used as a starter to start up the engine 11, or is used as a generator, it is also possible to use the electric motor 25 as an auxiliary drive power source when the engine torque TE has changed due to a change in the degree η of throttle opening of the engine 11.

Figure 2:
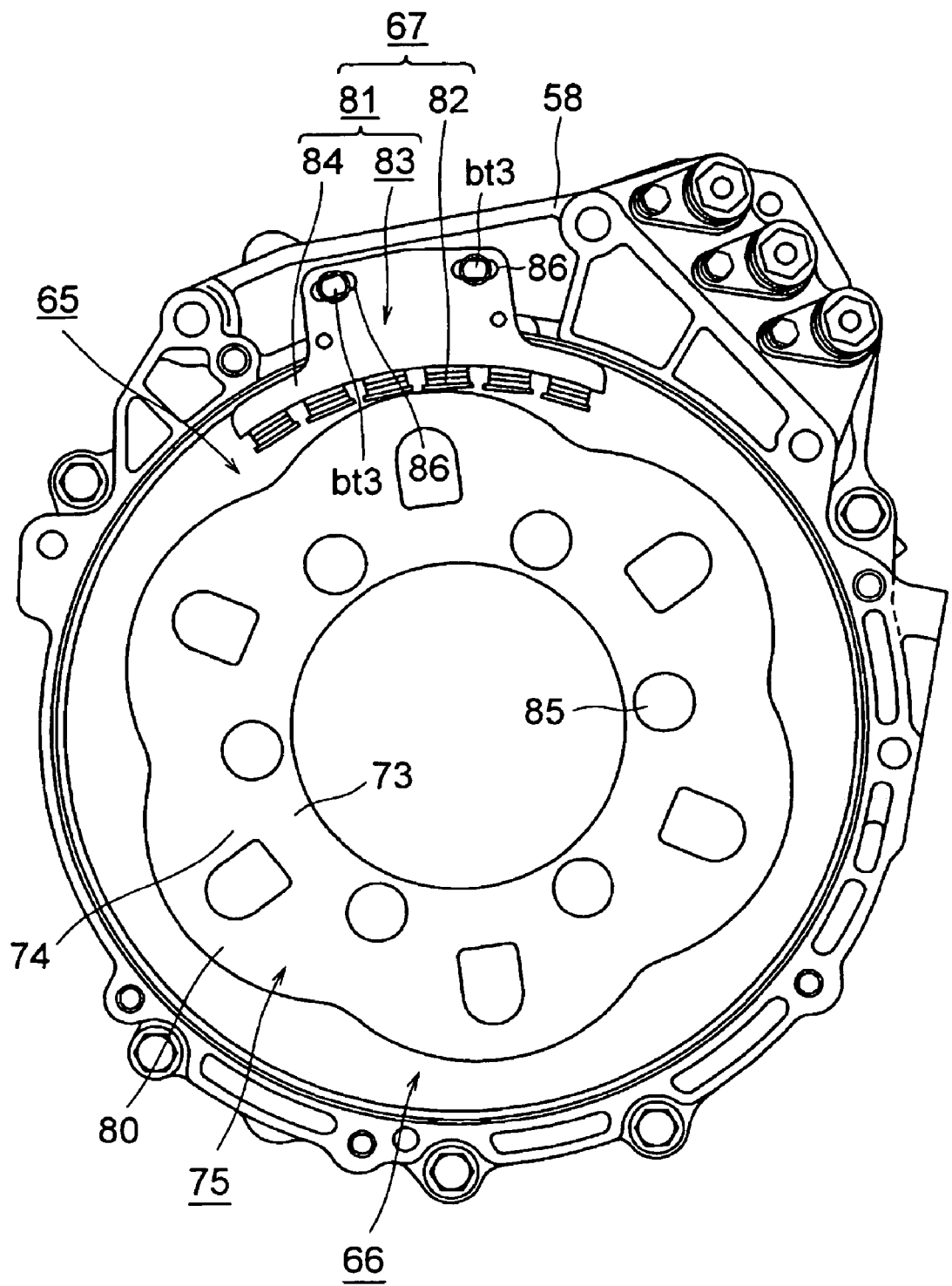
FIG. 2 is a diagram illustrating a mounted state of a resolver in the first exemplary embodiment.

In this embodiment, the resolver 65 adopted is a segment-type resolver. Therefore, as shown in FIG. 2, the flat portion 75 has a plurality of protruded portions 80, that is, six protruded portions in this embodiment, which are protruded radially outwardly, with the number of angle multiplications X being 6. The protruded portions 80 form six arcuate portions along an outer peripheral edge of the sensor rotor 66. That is, the outer peripheral edge of the sensor rotor 66 is provided with a special curved line formed so that the gap permeance between the sensor rotor 66 and the sensor stator 67 changes in a fashion of sinusoidal waves. Incidentally, reference numeral 85 denotes mounting holes for the bolts bt3.

The sensor stator 67 has, on its inner peripheral edge, a core portion 81 that has a plurality of protruded teeth (not shown) which face radially inward, and sensor coils 82 wound on the individual teeth. The number of teeth in this embodiment is 6, that is, a multiple of 3. The core portion 81 includes a mounting portion 83 that is formed with a predetermined opening angle in order to attach the sensor stator 67 to the motor case 58, and a wire-wound portion 84 that is located radially inward of the inner peripheral surface of the motor case 58, that is protruded in the two opposite directions of a circumference from an inner peripheral edge-adjacent portion of the mounting portion 83, and that has a predetermined opening angle. The six sensor coils 82 are arranged along the inner peripheral edge of the wire-wound portion 84. Incidentally, the opening angle is set at 60° or greater in mechanical angle, and at 360° or greater in electrical angle.

In this case, the wire-wound portion 84 protrudes from the mounting portion 83 and is arrayed in the circumferential direction. The opening angle of the mounting portion 83 is smaller than the opening angle of the wire-wound portion 84. Therefore, the mounting space for the resolver 65 can be reduced, and the mounting characteristic can be improved.

The number of teeth formed on the wire-wound portion 84 is a multiple of 3, and is 6 in this embodiment. Of the 6 sensor coils 82 wound on the teeth, two coils are used as magnetization coils for inputting a magnetization signal SGi, and another two coils are used as coils for generating a first output signal SG1, and the other two coils are used as coils for generating a second output signal SG2. In this case, because the sensor rotor 66 has six protruded portions 80, the numbers of the first and second output signals SG1, SG2 corresponding to six rotations are produced and are sent to the R/D converter 77 during every rotation of the sensor rotor 66.

If the input voltage of the resolver 65 is represented by E, the magnetizing voltage Ein of the magnetization signal SGi is:

$Ein = E \cdot \sin \omega t.$

The output voltages Eout1, Eout2 of the first and second output signals SG1, SG2 are:

$Eout1 = K \cdot E \cdot \sin \omega t \cdot \cos(X \cdot \theta)$; and $Eout2 = K \cdot E \sin \omega t \cdot \cos(X \cdot \theta),$ where K is the ratio of voltage transformation, and t is time, and $\omega$ is angular speed ($=2\pi f$).

Figure 4:
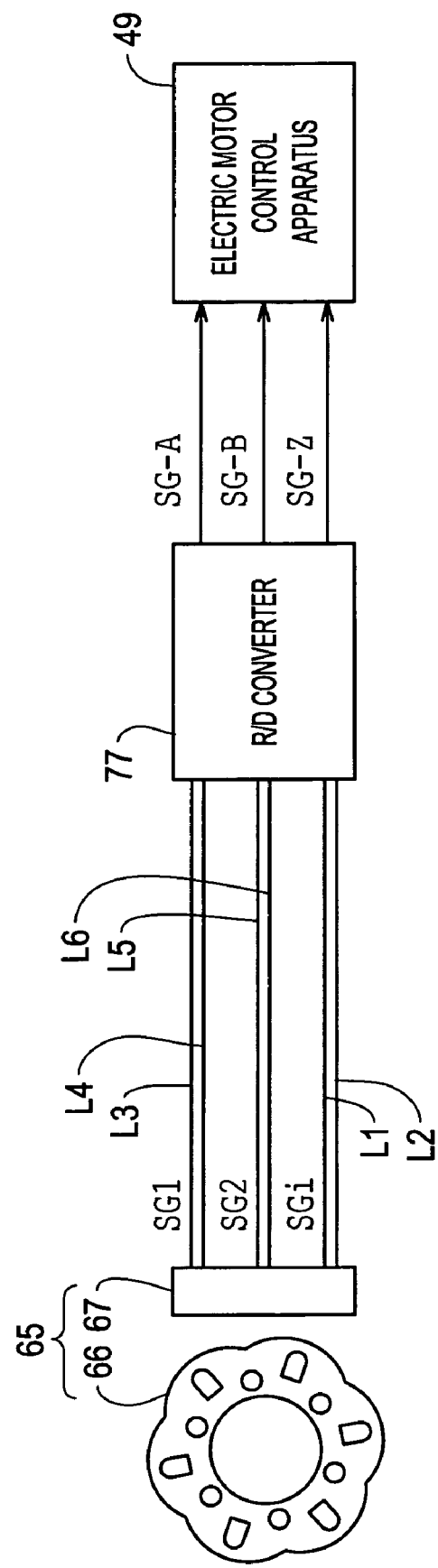
FIG. 4 is a block diagram illustrating portions of the electric drive control apparatus in the first exemplary embodiment.

Therefore, as shown in FIG. 4, the sensor stator 67 and the R/D converter 77 are interconnected by a line L1 for sending the magnetization signal SGi from the R/D converter 77 to the sensor stator 67, a grounding (GND) line L2 for the magnetization signal SGi, a line L3 for sending the first output signal SG1 from the sensor stator 67 to the R/D converter 77, a grounding line L4 for the first output signal SG1, a line L5 for sending the second output signal SG2 from the sensor stator 67 to the R/D converter 77, and a grounding line L6 for the second output signal SG2.

Furthermore, the R/D converter 77 and the electric motor control apparatus 49 are interconnected. The R/D converter 77, upon receiving the first and second output signals SG1, SG2 from the sensor stator 67, generates an A-phase signal SG-A, a B-phase signal SG-B, and a Z-phase signal SG-Z as detection signals, and sends the signals to the electric motor control apparatus 49. On the basis of the A-phase signal SG-A, the B-phase signal SG-B and the Z-phase signal SG-Z, therefore, the electric motor control apparatus 49 computes and detects the magnetic pole position $\theta$ and the electric motor rotation speed NM as an electric machine rotation speed.

Thus, in this embodiment, the resolver 65 employed is a segment-type resolver, and there is no need to employ an all-round embracing type resolver that embraces the entire shaft of the electric motor 25. Hence, the electric drive apparatus can be reduced in size.

Furthermore, even if the motor rotation speed NM is low, the A-phase signal SG-A, the B-phase signal SG-B and the Z-phase signal SG-Z are generated, so that the magnetic pole position $\theta$ can be detected. Thus, a sufficient motor torque TM can be generated. As there is no need to use a motor of high rating, the cost of the electric drive apparatus can be curbed.

Elongated holes 86 through which the bolts bt3 are inserted are formed in an outer peripheral edge-adjacent portion of the mounting portion 83. Therefore, by loosening the bolts bt3 and changing the positions of the bolts in the elongated holes 86, the position of the sensor stator 67 with respect to the sensor rotor 66 in the circumferential direction can be adjusted. As a result, the magnetic pole position $\theta$ can be detected with good precision. Furthermore, because the wire-wound portion 84 protrudes from the two opposite ends, or wings, on the same side of the mounting portion 83, a sufficient quantity of sensor coils 82 can be provided on the wire-wound portion 84. Therefore, the magnetic pole position $\theta$ can be detected with further improved precision.

Figure 5:
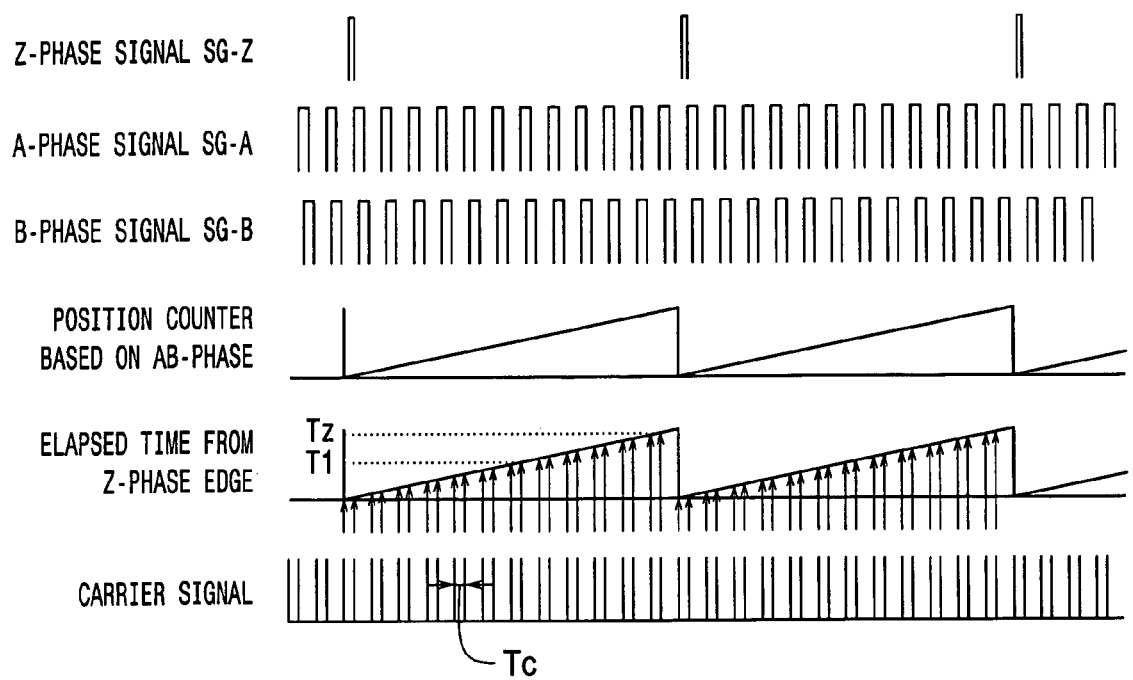
FIG. 5 is a timing chart illustrating a method for computing the magnetic pole position and the electric motor rotation speed according to the first exemplary embodiment.

Next, the methods of computing the magnetic pole position $\theta$ and the electric motor rotation speed NM will be described. FIG. 5 is a timing chart illustrating a method for computing the magnetic pole position and the electric motor rotation speed in accordance with the first exemplary embodiment.

As for the Z-phase signal SG-Z, as indicated in the chart of FIG. 5, Z-phase edges (rising edge) occur with a predetermined period or in cycles of 360° in electrical angle. As for the A-phase signal SG-A and the B-phase signal SG-B, edges (rising edges) of the A-phase and B-phase (hereinafter, referred to as "AB-phase") occur at a very short predetermined frequency and with a predetermined phase difference therebetween.

Therefore, if the period of the Z phase, which represents the time between edges in the Z phase, is represented as Tz, the angular speed $\omega z$ [°/s] in the Z phase is computed as follows:

$$\omega z = 360/Tz. \qquad (1)$$

Through unit conversion, the electric motor rotation speed NMz [rpm] in the Z phase can be computed. The period Tz constitutes or corresponds to a first sampling period. Because Z-phase edges occur in cycles of 360° in electrical angle, the Z-phase magnetic pole position $\theta z°$ can be computed as follows:

$$\begin{aligned}\theta z &= \theta z \cdot T1 \\ &= 360 \cdot T1/Tz,\end{aligned} \qquad (2)$$

where T1 is the amount of time following the previous occurrence of a Z-phase edge, that is, the elapsed time.

During each cycle of 360° ($=2\pi$ radian) in electrical angle, a predetermined number Cab of AB-phase edges are generated. Therefore, AB-phase edges are counted by a position counter (not shown), and the thus-obtained count value is determined as Ci. Then, the count value Ci is read in on the basis of a carrier signal generated with a predetermined carrier period Tc, and the rotational position $\epsilon i$ can be computed. Incidentally, the carrier period Tc constitutes a second sampling period.

Therefore, an AB-phase angular speed $\omega ab$ [°/s] is computed from the present rotational position $\epsilon i$, the previous rotational position $\epsilon(i-1)$ and the carrier period Tc as follows.

$$\omega ab = (\epsilon i - \epsilon(i-1))/Tc. \qquad (3)$$

The AB-phase electric motor rotation speed NMab [rpm] can be computed through unit conversion.

Then, the present rotational position $\epsilon 1$ can be computed as an AB-phase magnetic pole position $\theta ab°$:

$$\theta ab = \epsilon 1. \qquad (4)$$

In this manner, the angular speed $\omega z$ and the magnetic pole position $\theta z$ can be computed in accordance with the Z phase, and the angular speed $\omega ab$ and the magnetic pole position $\theta ab$ in accordance with the AB phase.

In the case where the resolver 65 (FIG. 4) is a segment-type resolver and where there is a mounting error regarding the sensor rotor 66 or the sensor stator 67, for example, the sensor rotor 66 is mounted with a center deviation, or the sensor stator 67 is mounted with an inclination, a result will be that the gap permeance between the sensor rotor 66 and the sensor stator 67 does not change in a sinusoidal fashion, so that the output voltages Eout1, Eout2 cannot be generated with good accuracy. Therefore, the accuracy of the A-phase signal SG-A, the B-phase signal SG-B and the Z-phase signal SG-Z degrades, and the detection accuracy of the angular speeds ωz, ωab and the magnetic pole positions θz, θab correspondingly degrades.

Figure 6:
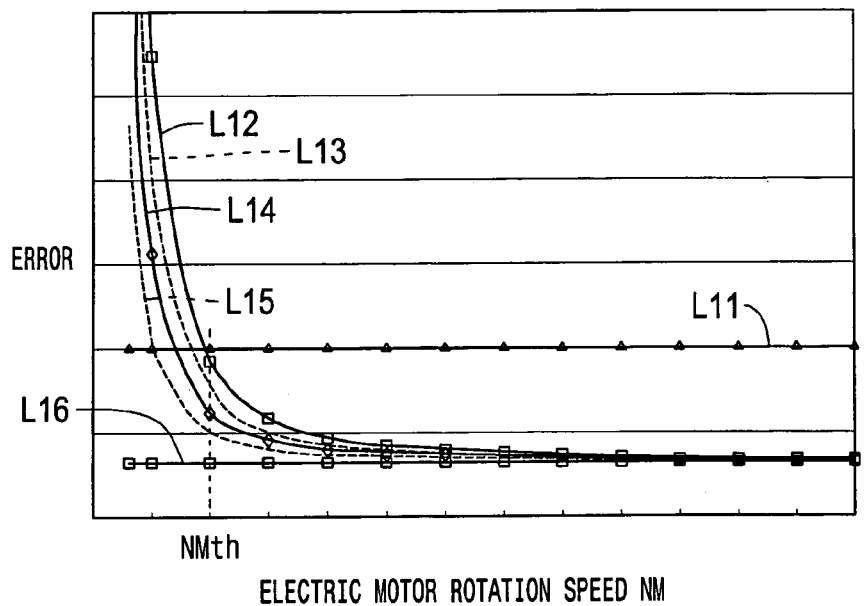
FIG. 6 is a diagram indicating magnetic pole position error characteristics in the first exemplary embodiment.
Figure 7:
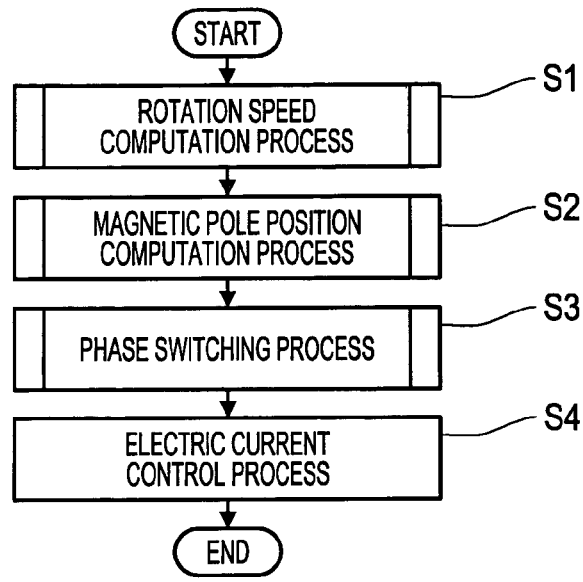
FIG. 7 is a main flowchart illustrating operations of an electric motor control apparatus according to the first exemplary embodiment.
Figure 8:
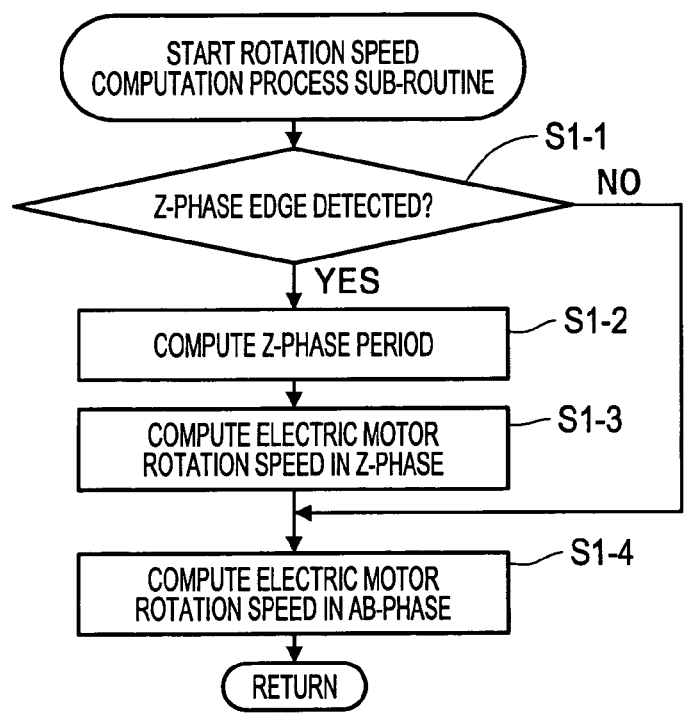
FIG. 8 is a flowchart illustrating a sub-routine of a rotation speed computation process in the first exemplary embodiment.
Figure 9:
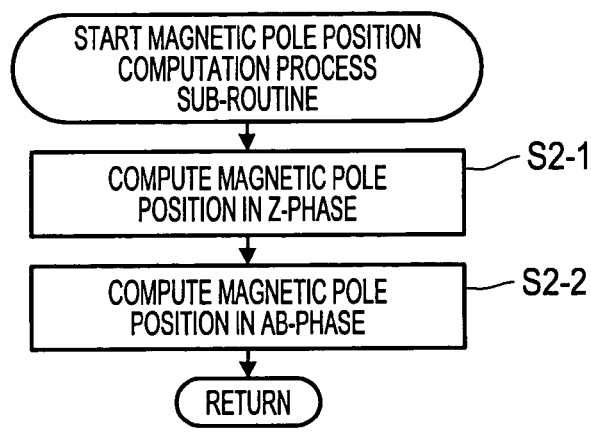
FIG. 9 is a flowchart illustrating a sub-routine of a magnetic pole position computation process in the first exemplary embodiment.
Figure 10:
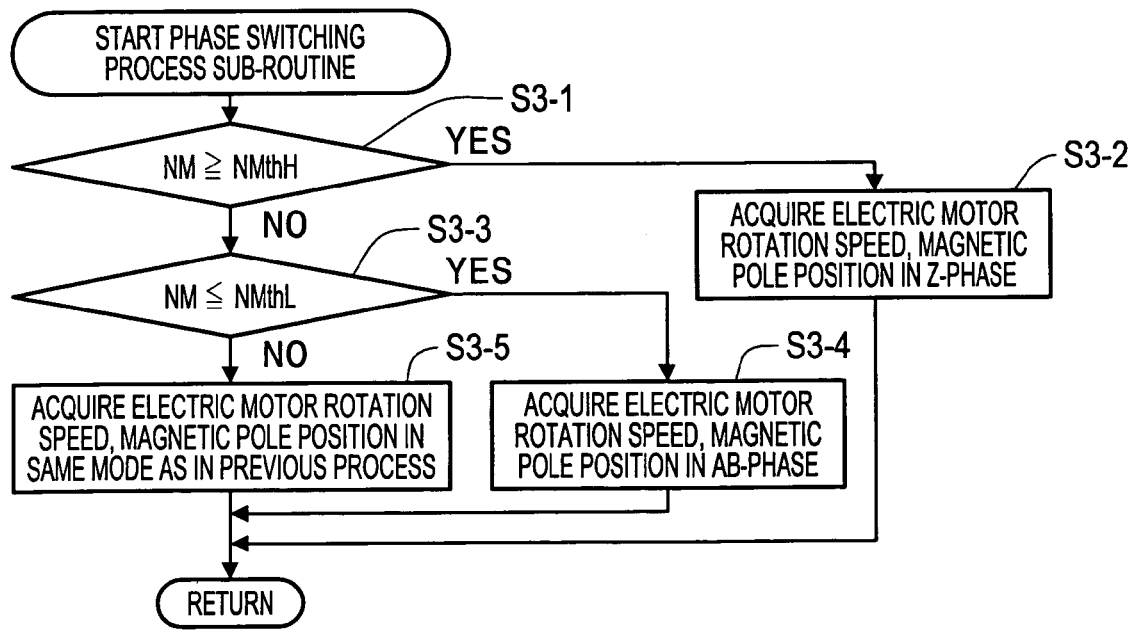
FIG. 10 is a flowchart illustrating a sub-routine of a phase switching process in the first exemplary embodiment.

FIG. 6 is a diagram indicating magnetic pole position error characteristics in the first exemplary embodiment. In FIG. 6, the horizontal axis indicates the electric motor rotation speed NM, and the vertical axis indicates errors (electrical angle) in the magnetic pole positions θz, θab.

In FIG. 6, reference character L11 denotes a line indicating errors in the magnetic pole position θab; reference character L12 denotes a line indicating errors in the magnetic pole position θz when the electric motor acceleration α is α1 rpm; reference character L13 denotes a line indicating errors in the magnetic pole position θz when the electric motor acceleration α is α2 rpm (<α1); reference character L14 denotes a line indicating errors in the magnetic pole position θz when the electric motor acceleration α is α3 rpm (<α2); reference character L15 denotes a line indicating errors in the magnetic pole position θz when the electric motor acceleration α is α4 rpm (<α3); and reference character L16 denotes a line indicating errors in the magnetic pole position θz when the electric motor acceleration α is 0 [rpm] (steady state). The electric motor acceleration α constitutes the electric machine acceleration.

As indicated in the drawings, if the electric motor 25 (FIG. 3) is accelerated, the error in the magnetic pole position θz increases with increases in the electric motor acceleration α as the computation of the magnetic pole position θz has to always use a previous edge occurring one sampling period (360°) before.

Regardless of the electric motor acceleration α, if the electric motor rotation speed NM is lower than a threshold value NMth that represents a phase switch rotation speed, the error in the magnetic pole position θab is smaller than the error in the magnetic pole position θz. If the electric motor rotation speed NM is greater than or equal to the threshold value NMth, the error in the magnetic pole position θz is smaller than the error in the magnetic pole position θab.

Therefore, in this embodiment, the phase is changed between the AB phase and the Z phase on the basis of the electric motor rotation speed NM. If the electric motor rotation speed NM is lower than the threshold value NMth, the electric motor 25 is controlled in accordance with the angular speed ωab and the magnetic pole position θab. If the electric motor rotation speed NM is greater than or equal to the threshold value NMth, the electric motor 25 is controlled in accordance with the angular speed ωz and the magnetic pole position θz.

Operations of the electric motor control apparatus 49 will next be described. In this case, the electric motor control apparatus 49 (FIG. 3) performs a feedback control through a vector control calculation on a d-q axes model in which the axis d is defined in a direction of a magnetic pole pair of the rotor 31 (FIG. 1) of the motor 25 and the q axis is defined in a direction perpendicular to the d axis.

First, a rotation speed computation process means (not shown) of the electric motor control apparatus 49 executes a rotation speed computation process (step S1) in which the apparatus reads in the A-phase signal SG-A, the B-phase signal SG-B and the Z-phase signal SG-Z, and computes an electric motor rotation speed NM.

Therefore, an edge detection process means of the rotation speed computation process means executes an edge detection process (step S1). In the process, the edge detection process means determines whether a Z-phase edge has been detected. If a Z-phase edge is detected (step S1-1, Yes), a period computation process means of the rotation speed computation process means executes a period computation process to compute a period Tz of the Zphase (step S1-2). Next, a first speed computation process means of the rotation speed computation process means executes a first speed computation process in which the first speed computation process means computes an angular speed ωz in the Z phase as an angular speed ω on the basis of the equation (1), and computes an electric motor rotation speed NMz in the Z phase as an electric motor rotation speed NM (step S1-3).

A second speed computation process means of the rotation speed computation process means, either after S1-1, No or following step S1-3, executes a second speed computation process in which the process means computes an angular speed ωab in the AB phase as an angular speed ω on the basis of the equation (3), and furthermore computes an electric motor rotation speed NMab in the AB phase as an electric motor rotation speed NM (step S1-4). In order to acquire the counter value Ci, the position counter is provided within the electric motor control apparatus 49. The process then returns to step S2.

A magnetic pole position computation process means (not shown) of the electric motor control apparatus 49 executes a magnetic pole position computation process to compute the magnetic pole position θ (step S2). To that end, a first position computation process means of the magnetic pole position computation process means executes a first position computation process. In the computation process, the first position computation process means reads in the angular speed ωz and the elapsed time T1, and computes the magnetic pole position θz in the Z phase as a magnetic pole position θ on the basis of the equation (2) (step S2-1).

Furthermore, a second position computation process means of the magnetic pole position computation process means executes a second computation process in which the second position computation process means reads in the count value Ci, and computes the magnetic pole position θab in the AB phase as a magnetic pole position θ on the basis of the equation (4) (step S2-2). The process then returns to step S3.

Subsequently, a phase switching process means (not shown) of the electric motor control apparatus 49 executes a phase switching process (step S3). In the process, the phase switching process means reads in the electric motor rotation speed NM, and carries out the phase switching for computing the magnetic pole position θ on the basis of the electric motor rotation speed NM. To that end, the phase switching process means determines whether the electric motor rotation speed NM is greater than or equal to a first threshold value NMthH (640 rpm) (step S3-1, Yes). If the electric motor rotation speed NM is greater than or equal to the first threshold value NMthH (step S3-1, Yes), a control parameter acquisition process means of the phase switching process means executes a control parameter acquisition process in which the process means acquires the electric motor rotation speed NMz and the magnetic pole position θz as control parameters (step S3-2).

If the electric motor rotation speed NM is less than the first threshold value NMthH, (step S3-1, No), the control parameter acquisition process means determines whether the electric motor rotation speed NM is less than or equal to a second threshold value NMthL (440 rpm) (step S3-3). If the electric motor rotation speed NM is less than or equal to the second threshold value NMthL (step S3-3, Yes), the control parameter acquisition process means acquires the electric motor rotation speed NMab and the magnetic pole position θab as control parameters (step S3-4). If the electric motor rotation speed NM is higher than the second threshold value NMthL (step S3-3, No), the control parameter acquisition process means determines the electric motor rotation speed NM and the magnetic pole position θ in the manner as determined in the immediately preceding iteration (step S3-5), as control parameters.

The first threshold value NMthH and the second threshold value NMthL are set at different values in order to achieve hysteresis. As for the electric motor rotation speed NM to be compared with the first threshold value NMthH or the second threshold value NMthL, the electric motor rotation speed NMab is read in during an initial state where the driving of the electric motor 25 starts. After that, the electric motor rotation speed NMab is determined, as described above, and used the electric motor rotation speed NMz is acquired as a result of step S3-1, Yes. After the electric motor rotation speed NMz is acquired, the electric motor rotation speed NMz is determined, as described above, and used until the electric motor rotation speed NMab is acquired as a result of step S3-1, No.

The Z phase and the AB phase are switched in this manner, and the electric motor rotation speed NMab or NMz is acquired as the electric motor rotation speed NM and the magnetic pole position θab or θz is acquired as the magnetic pole position θ. Then, an electric current control process means (not shown) of the electric motor control apparatus 49 executes an electric current control process (step S4). In the control process, the electric current control process means reads in the target motor torque TM* and the battery voltage VB, and computes and determines a d-axis current instruction value IMd* and a q-axis current instruction value IMq* with reference to an electric current instruction value map for motor control recorded in a recording device (not shown) of the electric motor control apparatus 49, on the basis of the electric motor rotation speed NMab, NMz, the target motor torque TM* and the battery voltage VB.

The electric current control process means reads in the currents IMU, IMV from the electric current sensors 68, 69, and computes a current IMW from the currents IMU, IMV as follows:

$$IMW = -IMU - IMV.$$

The current IMW may instead be detected using an electric current sensor as in the case of the currents IMU, IMV.

Subsequently, an alternating-current computation process means of the electric current control process means executes an alternating-current computation process of computing a d-axis current IMd and a q-axis current Imq, both of which are alternating currents. To that end, the alternating-current computation process means executes a 3-phase/2-phase conversion, whereby the currents IMU, IMV, IMW are converted into the d-axis current IMd and the q-axis current IMq. Then, an AC voltage instruction value computation process means of the electric current control process means executes an AC voltage instruction value computation process in which the AC voltage instruction value computation process means computes voltage instruction values VMd*, VMq* on the basis of the d-axis current IMd and the q-axis current IMq as well as the d-axis current instruction value IMd* and the q-axis current instruction value IMq*. Furthermore, the electric current control process means executes a 2-phase/3-phase conversion whereby the voltage instruction values VMd*, VMq* are converted into voltage instruction values VMU*, VMV*, VMW*. On the basis of the voltage instruction values VMU*, VMV*, VMW*, the electric current control process means computes pulse width modulation signals SU, SV, SW. Then, the process means outputs the pulse width modulation signals SU, SV, SW to a drive process means (not shown) of the electric motor control apparatus 49. The drive process means executes a drive process in which the process means sends drive signals to the inverter 29 on the basis of the pulse width modulation signals SU, SV, SW. In this manner, a feedback control is executed.

Thus, if the electric motor rotation speed NM is low as in the case of startup of the electric motor 25, the magnetic pole position θab is computed. Conversely, if the electric motor rotation speed NM is relatively high, the magnetic pole position θz is computed. Therefore, the magnetic pole position θ can easily be detected with good accuracy. Hence, sufficient motor torque TM can be generated. Furthermore, as there is no need to use a motor of high rating, the cost of the electric drive apparatus can be reduced.

As indicated in FIG. 6, if the electric motor acceleration α changes so that the error in the magnetic pole position θz becomes smaller than the error in the magnetic pole position θab, the electric motor rotation speed NM changes. Therefore, in a second exemplary embodiment, the threshold value NMth is changed and set corresponding to the electric motor acceleration α.

Figure 11:
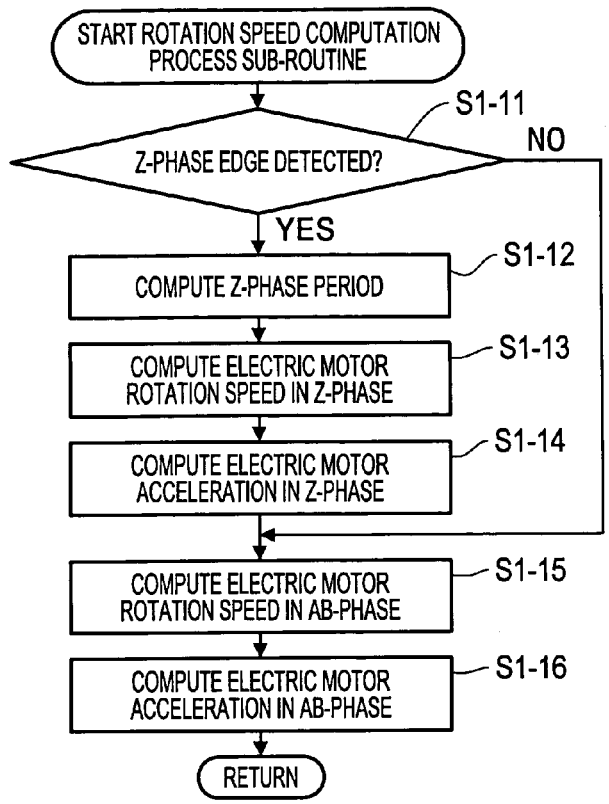
FIG. 11 is a flowchart illustrating a sub-routine of a rotation speed computation process according to a second exemplary embodiment.
Figure 12:
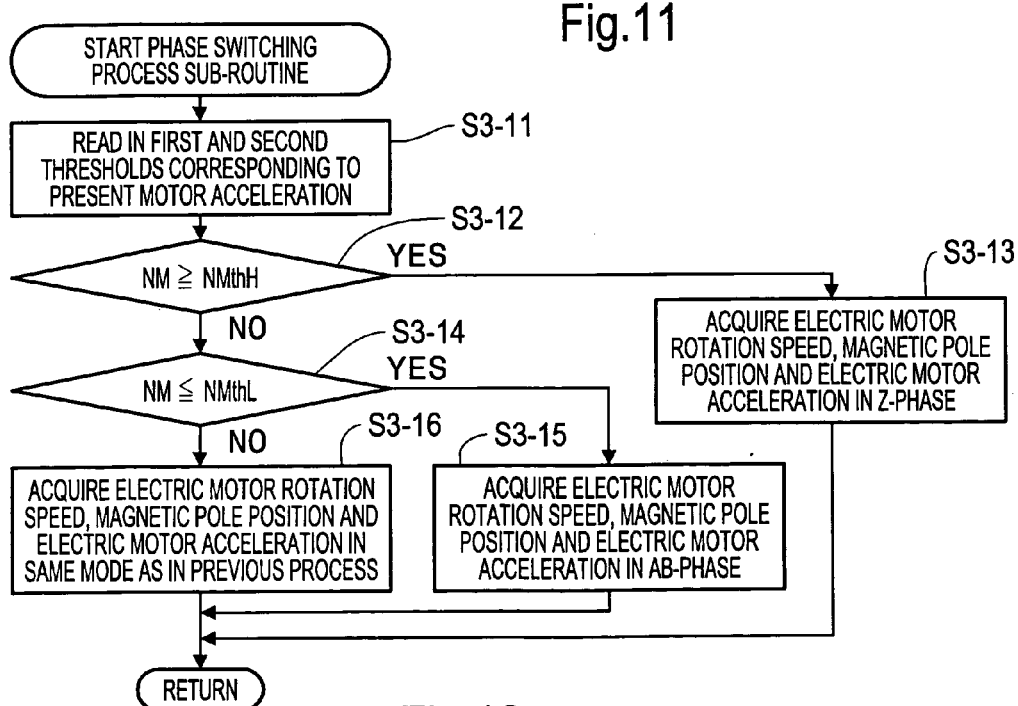
FIG. 12 is a flowchart illustrating a sub-routine of a phase switching process according to the second exemplary embodiment.
Figure 13:
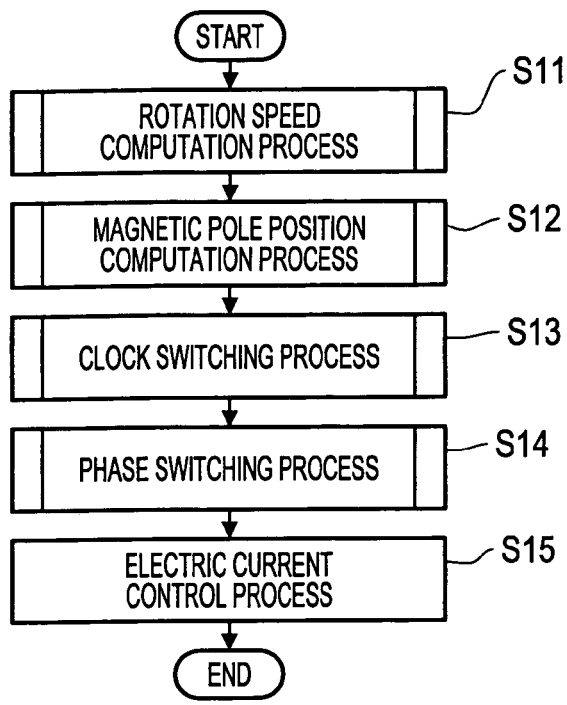
FIG. 13 is a main flowchart illustrating operations of an electric motor control apparatus according to a third exemplary embodiment.
Figure 14:
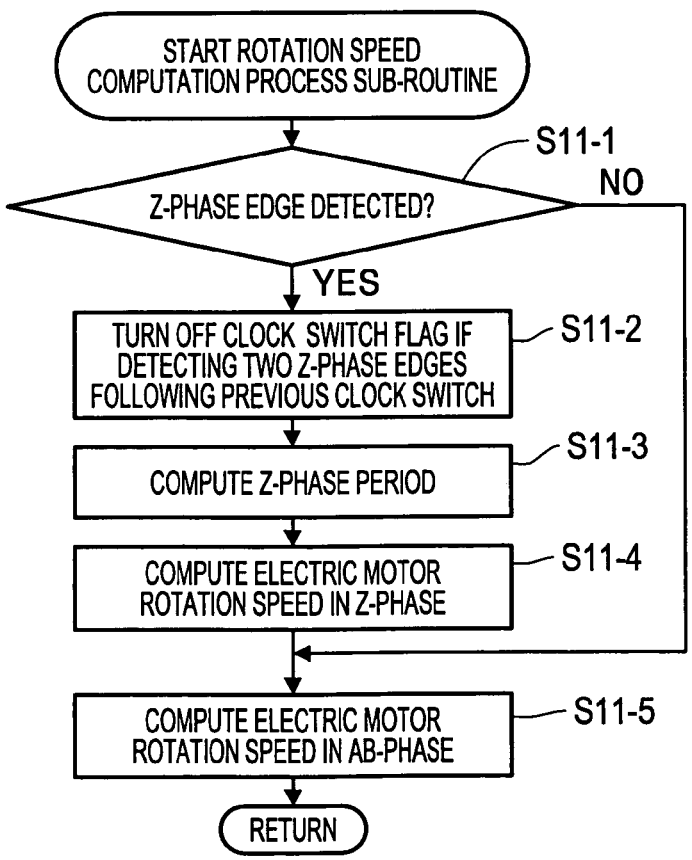
FIG. 14 is a flowchart illustrating a sub-routine of a rotation speed computation process in the third exemplary embodiment.
Figure 15:
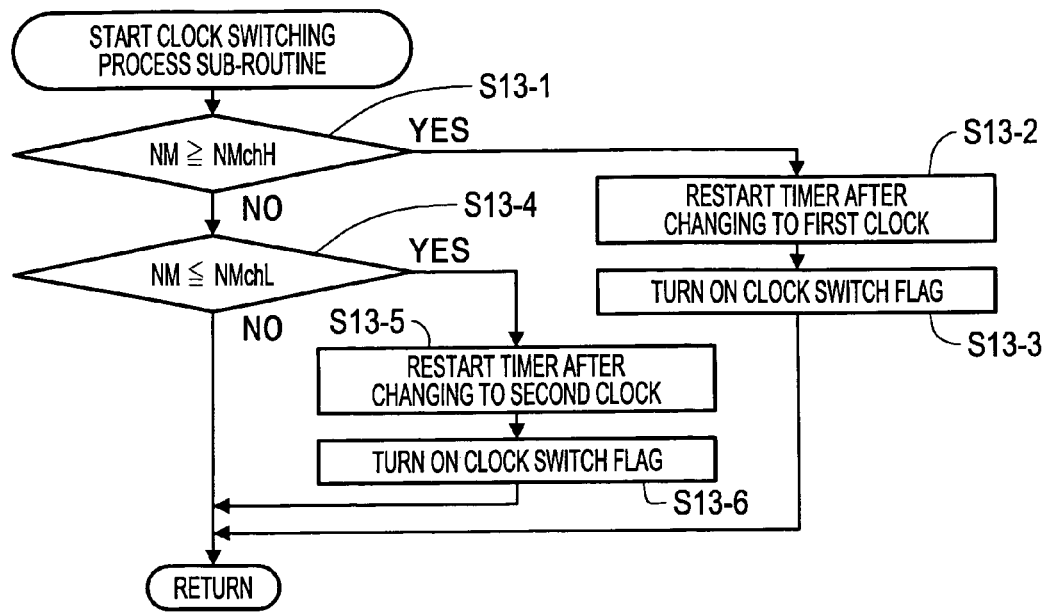
FIG. 15 is a flowchart illustrating a sub-routine of a clock switching process in the third exemplary embodiment.
Figure 16:
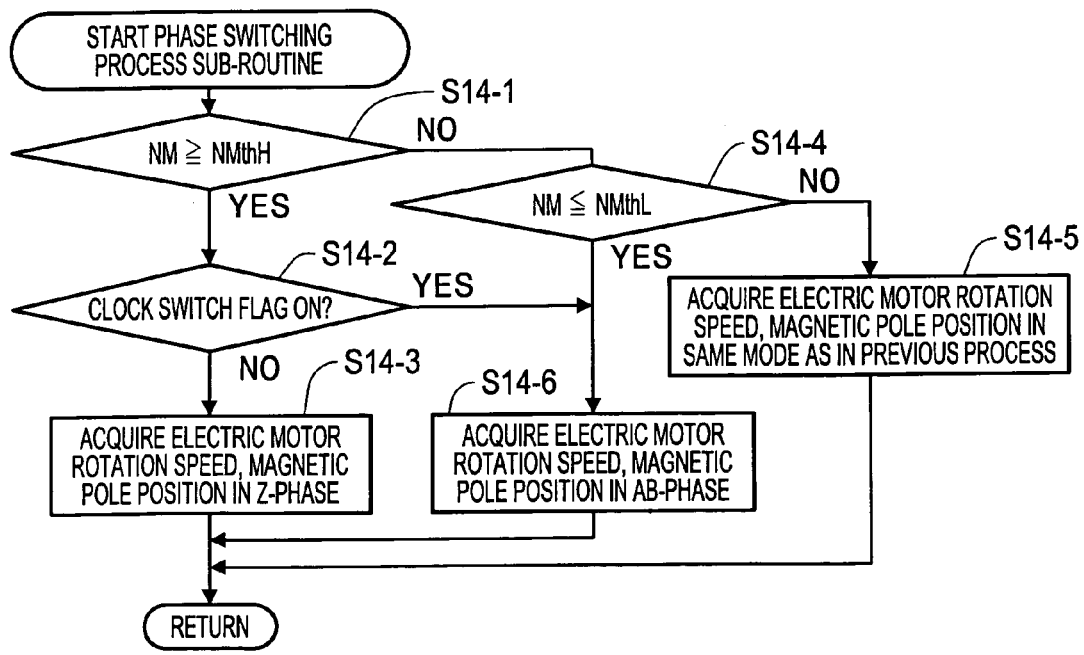
FIG. 16 is a flowchart illustrating a sub-routine of a phase switching process in the third exemplary embodiment.

FIG. 11 is a flowchart illustrating a sub-routine of a rotation speed computation process according to the second exemplary embodiment. FIG. 12 is a flowchart illustrating a sub-routine of a phase switching process according to the second exemplary embodiment.

In this case, the edge detection process means of the rotation speed computation process means determines whether a Z-phase edge has been detected (step S1-11, Yes). If a Z-phase edge is detected, the period computation process means of the rotation speed computation process means computes the period Tz of the Z phase (step S1-12). Then, the first speed computation process means of the rotation speed computation process means computes the angular speed ωz in the Z phase as an angular speed ω on the basis of the equation (1), and computes the electric motor rotation speed NMz in the Z phase as an electric motor rotation speed NM (step S1-13). Subsequently, a first acceleration computation process means of the rotation speed computation process means executes a first acceleration computation process in which the process means computes the electric motor acceleration αz in the Z phase as an electric motor acceleration α by dividing a difference between the present electric motor rotation speed NMz and the previous electric motor rotation speed NMz by the period Tz (step S1-14).

Further, when the Z-phase edge has not been detected (step S1-11, No) or following step S1-14, the second speed computation process means of the rotation speed computation process means computes the angular speed ωab in the AB phase as a angular speed ω on the basis of the equation (3), and furthermore computes the electric motor rotation speed NMab in the AB phase as an electric motor rotation speed NM (step S1-15). A second acceleration computation process means of the rotation speed computation process means executes a second acceleration computation process in which the process means computes the electric motor acceleration αab in the AB phase as an electric motor acceleration α by dividing a difference between the present electric motor rotation speed NMab and the previous electric motor rotation speed NMab by the carrier period Tc (step S1-16).

Next, in step S2, the first position computation process means of the magnetic pole position computation process means reads in the angular speed ωz and the elapsed time T1, and computes the magnetic pole position $\theta z$ in the Z phase as a magnetic pole position $\theta$ on the basis of the equation (2) (step S2-1).

Furthermore, the second position computation process means of the magnetic pole position computation process means reads in the count value Ci, and computes the magnetic pole position $\theta ab$ in the AB phase as a magnetic pole position $\theta$ on the basis of the equation (4) (step S2-2).

Subsequently, a phase-switch rotation speed setting process means of the phase switching process means executes a phase-switch rotation speed setting process (step S3). In the process, the setting process means reads in the present electric motor acceleration $\alpha$, and reads and sets the first threshold value NMthH and the second threshold value NMthL corresponding to the present electric motor acceleration $\alpha$, with reference to a threshold value map (not shown) recorded in the recording device (step S3-11).

Next, the control parameter acquisition process means of the phase switching process means reads in the electric motor rotation speed NM, and determines whether the electric motor rotation speed NM is greater than or equal to the first threshold value NMthH (step S3-12). If the electric motor rotation speed NM is greater than or equal to the first threshold value NMthH (step S3-12, Yes), the control parameter acquisition process means acquires the electric motor rotation speed NMz, the magnetic pole position $\theta z$ and the electric motor acceleration $\alpha z$ as control parameters (step S-13).

Conversely, if the electric motor rotation speed NM is less than the first threshold value NMthH (Step S3-12, No), the control parameter acquisition process means determines whether the electric motor rotation speed NM is less than or equal to the second threshold value NMthL (step S3-14). If the electric motor rotation speed NM is less than or equal to the second threshold value NMthL (step S3-14, Yes), the computation process acquisition process means acquires the electric motor rotation speed NMab, the magnetic pole position $\theta ab$ and the electric motor acceleration $\omega ab$ as control parameters (step S3-15). Conversely, if the electric motor rotation speed NM is higher than the second threshold value NMthL (step S3-14, No), the computation process acquisition process means determines the electric motor rotation speed NM, the magnetic pole position $\theta$ and the electric motor acceleration $\alpha$ in the same manner as determined in the immediately preceding iteration (step S3-16) as control parameters.

As for the electric motor acceleration $\alpha$ for reading in the first and second threshold values NMthH, NMthL and the electric motor rotation speed NM to be compared with the first and second threshold values NMthH, NMthL, the electric motor acceleration cab and the electric motor rotation speed NMab are read in during an initial state where the driving of the electric motor 25 starts, and after that, the electric motor acceleration cab and the electric motor rotation speed NMab are determined, as described above, and used until the electric motor acceleration $\alpha z$ and the electric motor rotation speed NMz are acquired as a result of step S3-12, Yes. After the electric motor acceleration $\alpha z$ and the electric motor rotation speed NMz are acquired, the electric motor acceleration $\alpha z$ and the electric motor rotation speed NMz are determined, as described above, and used until the electric motor acceleration $\alpha ab$ and the electric motor rotation speed NMab are acquired as a result of step S3-12, No.

The Z phase and the AB phase are switched in this manner, and the electric motor rotation speed NMab or NMz is acquired as the electric motor rotation speed NM and the magnetic pole position $\theta ab$ or $\theta z$ is acquired as the magnetic pole position $\theta$. Then, the electric current control process means of the electric motor control apparatus 49 executes an electric current control process.

Thus, the phase is changed between the AB phase and the Z phase on the basis of the electric motor rotation speed NM and the electric motor acceleration $\alpha$, and the first and second threshold values NMthH, NMthL are set corresponding to the electric motor acceleration $\alpha$, so that the phase switching can be executed with good precision. Therefore, the magnetic pole position $\theta$ can be detected with further improved ease and accuracy. As a result, ample motor torque TM can be generated.

In the foregoing exemplary embodiments, it is necessary to compute the period Tz of the Z phase in order to compute the angular speed $\omega z$ in the Z phase. To that end, the period computation process means computes the period Tz on the basis of the time measured by a Z-phase measurement-purpose timer (not shown) provided in the electric motor control apparatus 49 (FIG. 3). In a low rotation speed region where the electric motor rotation speed NM is low, it is possible to achieve relatively high accuracy in computing the period Tz as the period Tz is relatively long. In contrast, in a high rotation speed region where the electric motor rotation speed NM is high, the relatively short period Tz results in a relatively low accuracy in computing the period Tz, so that the accuracy in computing the angular speed $\omega z$ and the magnetic pole position $\theta z$ becomes low. Therefore, in a third exemplary embodiment described below with reference to FIGS. 13-18, the resolving power of the timer is changed between the low-rotation speed region and the high-rotation speed region.

First, the edge detection process means of the rotation speed computation process means (step S11) determines whether a Z-phase edge has been determined (step S11-1). If a Z-phase edge is detected (step S11-1, Yes), the edge detection process means determines whether two Z-phase edges have been detected following the previous clock switching in order to change the resolving power of the timer. If two Z-phase edges have been detected, a flag for changing the clock, that is, a clock-changing flag, is turned off (step S11-2).

Subsequently, the period computation process means of the rotation speed computation process means computes the period Tz in accordance with the present clock (step S11-3). Next, the first speed computation process means of the rotation speed computation process means computes the Z-phase angular speed $\omega z$ as an angular speed $\omega$ on the basis of the equation (1), and further computes the Z-phase electric motor rotation speed NMz as an electric motor rotation speed NM (step S11-4).

When the Z-phased $\Delta$ has not been determined (step S11-1, No) of following step S11-4, The second speed computation process means of the rotation speed computation process means computes the AB-phase angular speed $\omega ab$ as an angular speed $\omega$ on the basis of the equation (3), and further computes the AB-phase electric motor rotation speed NMab as an electric motor rotation speed NM (step S11-5).

The magnetic pole position computation process means computes the magnetic pole position $\theta$ (step S12). To that end, the first position computation process means of the magnetic pole position computation process means reads in the angular speed $\omega z$ and the elapsed time T1, and computes the Z-phase magnetic pole position $\theta z$ as a magnetic pole position $\theta$ on the basis of the equation (2) (the same as step S2-1).

The second position computation process means of the magnetic pole position computation process means reads in the count value Ci, and computes the AB-phase magnetic pole position θab as a magnetic pole position θ on the basis of the equation (4) (the same as step S2-2).

Subsequently, a clock switching process means (not shown) of the electric motor control apparatus 49 executes a clock switching process (step S13). In the process, the clock switching process means reads in a pre-set first switch value NMchH and a pre-set second switch value NMchL that represent clock switch rotation speeds from the recording device of the electric motor control apparatus 49, and determines whether the electric motor rotation speed NM is greater than or equal to the first switch value NMchH (2000 rpm) (step S13-1).

If the electric motor rotation speed NM is greater than or equal to the first switch value NMchH (step S13-1, Yes), the clock switching process means stops the timer, and changes the clock of the timer to a first clock CL1 ($\phi/16$) for use for a high rotation speed region. After that, the clock switching process means restarts the timer and turns a clock switch flag on. Thus, the resolving power of the timer is switched and set for the high rotation speed region.

Conversely, if the electric motor rotation speed NM is lower than the first switch value NMchH (step S13-1, No), the clock switching process means determines whether the electric motor rotation speed NM is less than or equal to the second switch value NMchL (step S13-4). If the electric motor rotation speed NM is less than or equal to the second switch value NMchL (step S13-14, Yes), the clock switching process means stops the timer, and changes the clock of the timer to a second clock CL2 ($\phi/64$). After that, the clock switching process means restarts the timer, and turns the clock switch flag on. Thus, the resolving power of the timer is switched to and set at a resolving power for a low rotation speed region. Conversely, if the electric motor rotation speed NM is greater than the second switch value NMchL (step S13-4, No) the process returns to step S14.

In this manner, the resolving power of the timer is changed between the resolving power for the low rotation speed region and the resolving power for the high rotation speed region. Therefore, it is possible to prevent a deterioration in the accuracy in calculation of the period Tz.

The first and second switch values NMchH, NMchL are set at different values so as to achieve a hysteresis. As for the electric motor rotation speed NM to be compared with the first and second switch values NMchH, NMchL, the electric motor rotation speed NMab is read in during an initial state where the driving of the electric motor 25 (FIG. 3) starts. After that, the electric motor rotation speed NMab is determined, as described above, and used until the electric motor rotation speed NMz is acquired as a result of step S14-3. After the electric motor rotation speed NMz is acquired, the electric motor rotation speed NMz is determined, as described above, and used until the electric motor rotation speed NMab is acquired as a result of step S14-5.

Subsequently, in step S14, the phase switching process means of the electric motor control apparatus 49 reads in the electric motor rotation speed NM, and determines whether the electric motor rotation speed NM is greater than or equal to a first threshold value NMthH (640 rpm) (step S14-1). If the electric motor rotation speed NM is greater than or equal to the first threshold value NMthH (step S14-1, Yes), the phase switching process means determines whether the clock switch flag is on (step S14-2). If the clock switch flag is on (step S14-2, Yes), the phase switching process means switches the phase in connection with the clock switching, and the control parameter acquisition process means of the phase switching process means acquires the electric motor rotation speed NMab and the magnetic pole position θab as control parameters (step S14-5).

Conversely, if the clock switch flag is off (step S14-2, No), the computation process acquisition process means of the phase switching process means acquires the electric motor rotation speed NMz and the magnetic pole position θz as control parameters (step S14-3).

If the electric motor rotation speed NM is lower than the first threshold value NMthH (step S14-1, No), the control parameter acquisition process means determines whether the electric motor rotation speed NM is less than or equal to a second threshold value NMthL (400 rpm)(step S14-4). If the electric motor rotation speed NM is less than or equal to the second threshold value NMthL (step S14-4, Yes), the control parameter acquisition process means acquires the electric motor rotation speed NMab and the magnetic pole position θab as control parameters (step S14-5). Conversely, if the electric motor rotation speed NM is higher than the second threshold value NMthL (step S14-4, No), the computation process acquisition process means determines the electric motor rotation speed NM and the magnetic pole position θ in the same manner as determined in the immediately preceding iteration (step S14-6), as control parameters.

Figure 17:
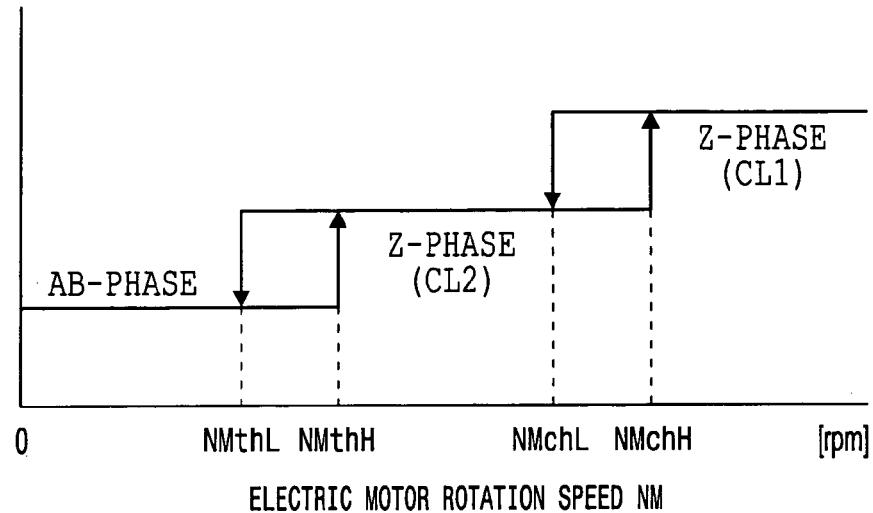
FIG. 17 is a conceptual diagram illustrating the phase switching process and the clock switching process in the third exemplary embodiment.

In this manner, the phase is changed between the Z phase and the AB phase, and further in the Z phase, the clock is switched between the first clock CL1 and the second clock CL2 as indicated in FIG. 17. Then, when the electric motor rotation speed NMab or NMz is acquired as an electric motor rotation speed NM and the magnetic pole position θab or θz is acquired as a magnetic pole position θ, the electric current control process means of the electric motor control apparatus 49 executes an electric current control process.

Figure 18:
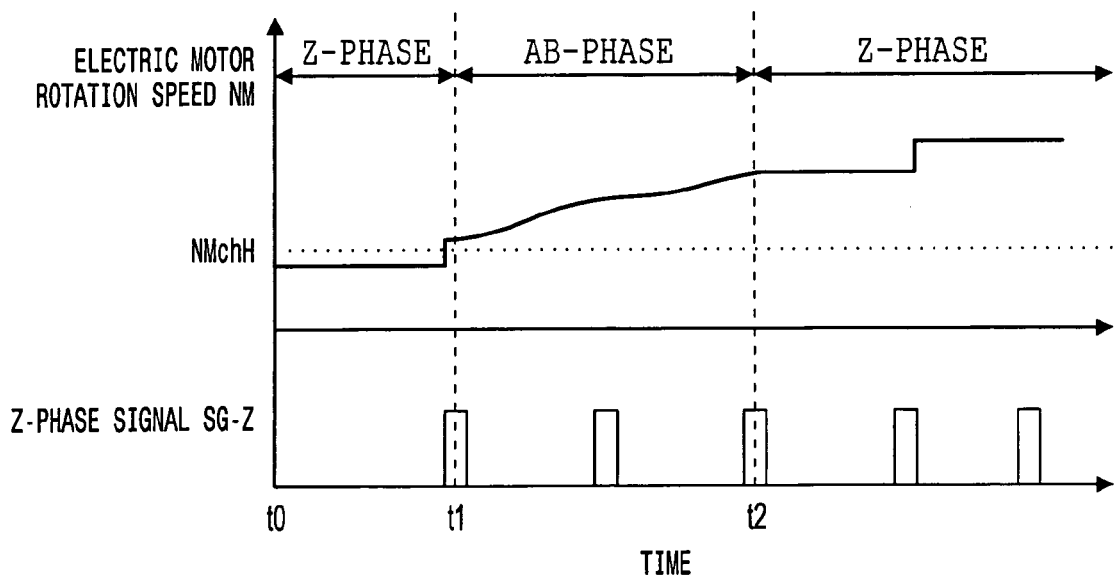
FIG. 18 is a timing chart of the phase switching process and the clock switching process in the third exemplary embodiment.

As indicated in FIG. 18, the Z phase is selected at a timing t0. Then, the control parameter acquisition process means acquires the electric motor rotation speed NMz and the magnetic pole position θz, and the electric current control process means executes the electric current control on the basis of the electric motor rotation speed NMz and the magnetic pole position θz. Then, when the electric motor rotation speed NM becomes equal to or greater than the first switch value NMchH at a timing t1, the clock switching process means stops the timer, and changes the clock of the timer to the first clock CL1 for use for the high rotation speed region. After that, the clock switching process means restarts the timer, and turns the clock switch flag on. As a result, the phase switching process means switches the phase to the AB phase, and the control parameter acquisition process means acquires the electric motor rotation speed NMab and the magnetic pole position θab, and the electric current control process means executes the electric current control on the basis of the electric motor rotation speed NMab and the magnetic pole position θab.

After that, when the edge detection process means detects a Z-phase edge at a timing t2 for the second time following the previous clock switching, the clock switching process means turns the clock switch flag off. Therefore, the phase switching process means switches the phase to the Z phase, and the control parameter acquisition process means acquires the electric motor rotation speed NMz and the magnetic pole position θz, and the electric current control process means executes the electric current control on the basis of the electric motor rotation speed NMz and the magnetic pole position θz.

As for the switching of the resolving power of the timer, even if the errors in the electric motor rotation speed NMz and the magnetic pole position θz become great in conjunction with the switching of the clock, selection of the AB phase is maintained so that the electric current control is executed on the basis of the electric motor rotation speed NMab and the magnetic pole position θab, during a period until the Z phase edge has been detected twice, that is, until the elapse of a pre-set transition period. Therefore, fluctuations that occur in the electric motor rotation speed NM and the magnetic pole position θ in conjunction with the switching of the resolving power of the timer can be curbed. Therefore, the motor torque TM can be stably generated.

Figure 19:
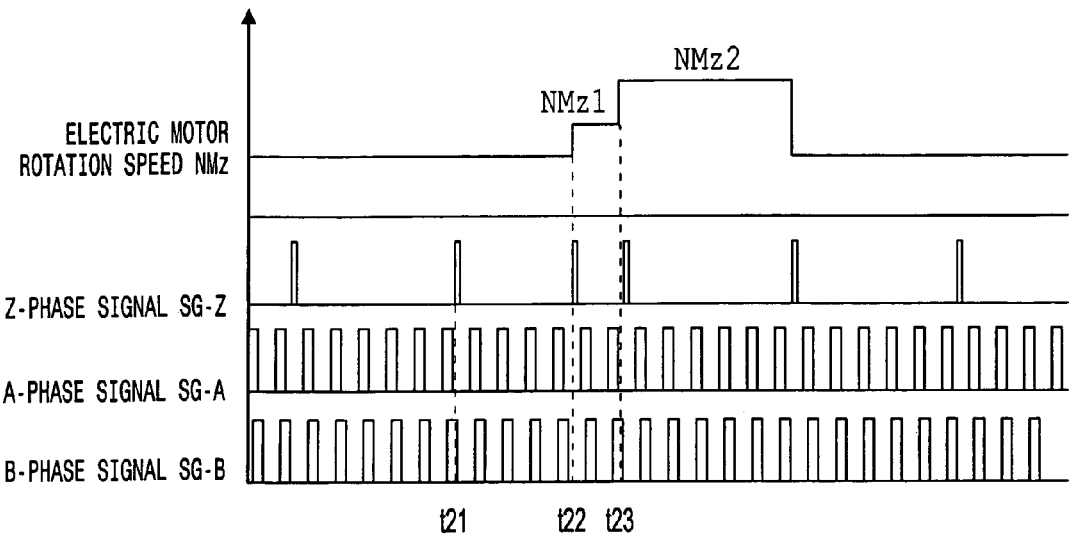
FIG. 19 is a timing chart indicating an operation of the magnetic pole position computation process in the case where noise occurs.

Incidentally, if the resolver 65, the R/D converter 77 or the like receives noise, a false Z-phase pulse may be produced in the Z-phase signal SG-Z. FIG. 19 is a timing chart indicating an operation of the magnetic pole position computation process in the case where noise occurs.

As indicated in FIG. 19, if generation of a normal pulse in the Z-phase signal SG-Z at a timing t21 is followed by occurrence of a false pulse at a timing t22 and then by generation of a normal pulse at a timing t23, the edge detection process means detects edges at the timings t21, t22 and t23, so that the period computation process means computes a period Tz1 that is shorter than the normal period Tz on the basis of the edges detected at the timings t21, t22, and computes a period Tz2 (<Tz1) that is shorter than the normal period Tz on the basis of the edges detected at the timings t22, t23. As a result, the rotation speed computation process means computes electric motor rotation speeds NMz1, NMz2 that are higher than the normal electric motor rotation speed NMz.

Therefore, in a fourth exemplary embodiment, even if a false pulse occurs in the Z-phase signal SG-Z, the electric motor rotation speed NMz can be computed with good accuracy.

Figure 20:
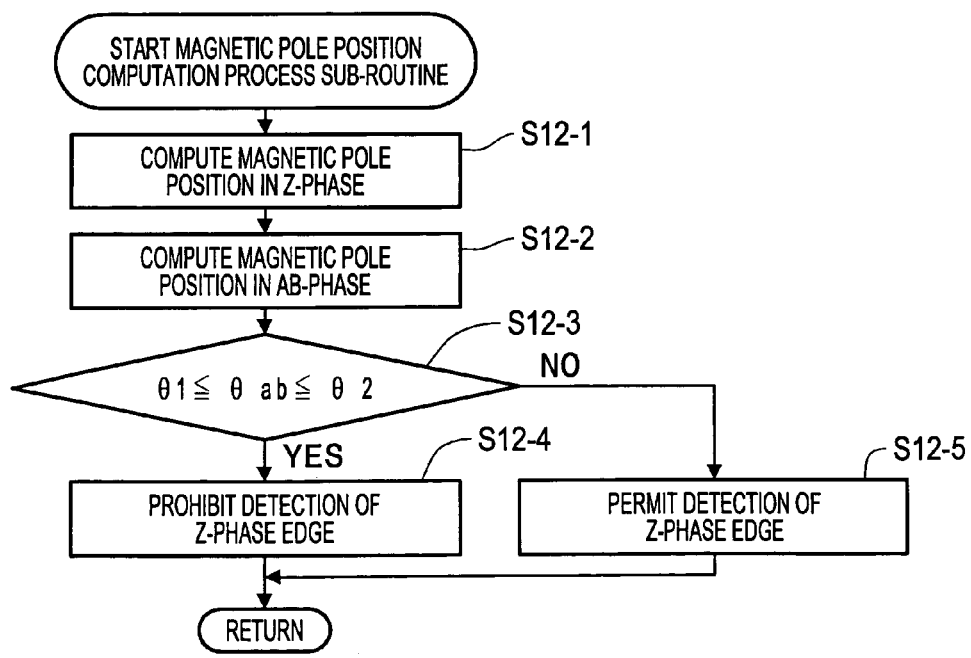
FIG. 20 is a flowchart illustrating a sub-routine of a magnetic pole position computation process in accordance with a fourth exemplary embodiment.

In this fourth exemplary embodiment of FIG. 20, the first position computation process means of the magnetic pole position computation process means reads in the angular speed ωz and the period T1, and computes the magnetic pole position θz in the Z phase as a magnetic pole position θ on the basis of the equation (2) (step S12-1).

Subsequently, the second position computation process means of the magnetic pole position computation process means computes the magnetic pole position θab in the AB phase on the basis of the equation (4) as a magnetic pole position θ (step S12-2).

A magnetic pole position determination process means of the magnetic pole position computation process means executes a magnetic pole position determination process in which the process means determines whether the magnetic pole position θab is within a predetermined range on the basis of the determination as to whether:

θ1≦θab≦θ2 (step S12-3).

If the magnetic pole position θab is within the predetermined range (step S12-3, Yes), an edge detection prohibition process means of the magnetic pole position computation process means executes an edge detection prohibition process, during which the edge detection prohibition process means sends to the edge detection process means a notification of prohibition that the detection of an edge in the Z-phase be prohibited, and discards the Z-phase edges detected by the edge detection process means (step S12-4).

If the magnetic pole position θab is not within the range (step S12-3, No), an edge detection permission process means of the magnetic pole position computation process means executes an edge detection permission process. In the process, the edge detection permission process means sends to the edge detection process means a notification of permission that the detection of an edge in the Z phase be permitted, and reads in the Z-phase edges detected by the edge detection process means (step S12-5).

Figure 21:
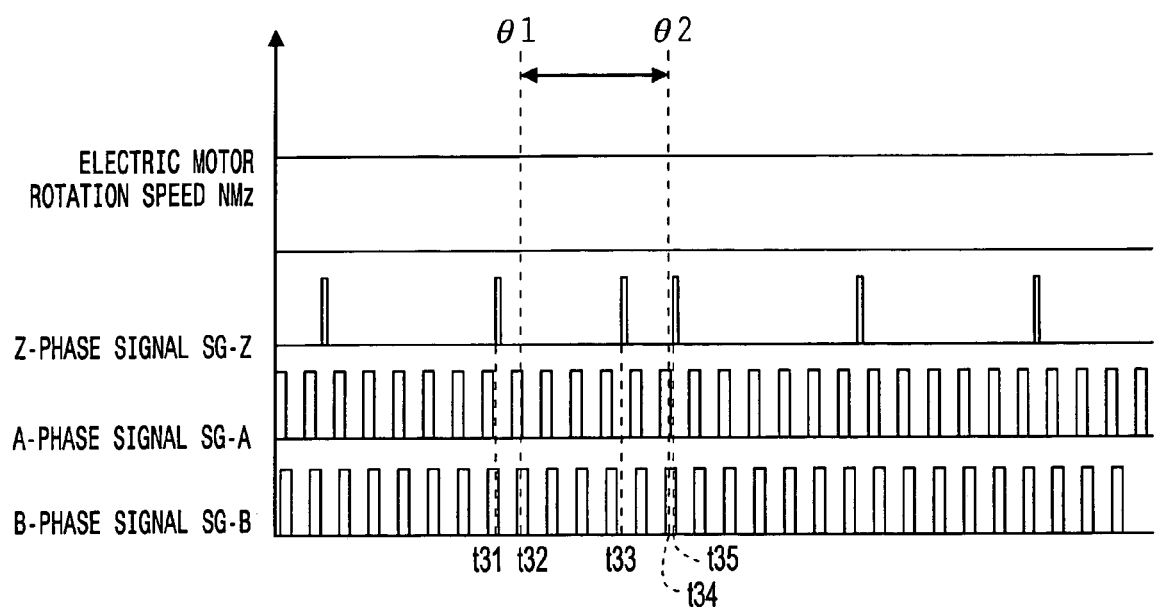
FIG. 21 is a timing chart indicating an operation of the magnetic pole position computation process in the fourth exemplary embodiment.

If generation of a normal pulse in the Z-phase signal SG-Z at a timing t31 is followed by occurrence of a false pulse at a timing t33 and then by generation of a normal pulse at a timing t35, as indicated in FIG. 21, the magnetic pole position computation process means determines whether the magnetic pole position θab is within the range. Then, while the magnetic pole position θab is within the range, that is, during a period from the timing t32 to the timing t34, the edge detection prohibition process means prohibits the edge detection process means from detecting a Z-phase edge. Therefore, the detection of the Z-phase edge at the timing t33 is avoided, so that the period computation process means computes a normal period Tz on the basis of the Z-phase edges at the timings t31, t35. As a result, the rotation speed computation process means computes a normal electric motor rotation speed NMz.

It is to be understood that the invention is not limited to the above-disclosed exemplary embodiments, but may be modified in various ways on the basis of the sprit of the invention, and such modifications are not excluded from the scope of the invention.

What is claimed is:

1. An electric drive control apparatus, comprising:
    a magnetic pole position detecting portion;
    a signal converter that generates a plurality of detection signals of different frequencies based on a sensor output of the magnetic pole position detecting portion;
    rotation speed computation process means for computing an electric machine rotation speed based on the plurality of detection signals;
    phase switching process means for performing phase switching for the plurality of detection signals of different frequencies for a magnetic pole position based on the electric machine rotation speed and a phase switch rotation speed; and
    magnetic pole position computation process means for computing the magnetic pole position based on a detection signal switched by the phase switching process means.

2. The electric drive control apparatus according to claim 1, further comprising acceleration computation process means for computing an electric machine acceleration based on the electric machine rotation speed, wherein the phase switching process means sets the phase switch rotation speed corresponding to the electric machine acceleration.

3. The electric drive control apparatus according to claim 1, further comprising clock switching process means for switching a clock for switching a resolving power based on the electric machine rotation speed, wherein the phase switching process means performs the phase switching in conjunction with switching of the clock.

4. The electric drive control apparatus according to claim 1, further comprising:
    magnetic pole position determination process means for determining whether the magnetic pole position is within a predetermined range; and
    edge detection prohibition process means for prohibiting detection of an edge in the detection signal if the magnetic pole position is within the predetermined range.

5. The electric drive control apparatus according to claim 1, wherein the plurality of detection signals of different frequencies includes an A-phase signal, a B-phase, and a Z-phase signal, and the phase switching process means performs the phase switching between an AB phase and a Z phase.

6. The electric drive control apparatus according to claim 1, wherein:
the rotation speed computation process means computes the electric machine rotation speed based on a Z-phase signal of the detection signal; and
the magnetic pole position computation process means computes the magnetic pole position based on the Z-phase signal based on the detection signal.

7. The electric drive control apparatus according to claim 6, wherein the magnetic pole position computation process means computes the magnetic pole position based on an angular speed in the Z phase and an elapsed time following previous detection of a Z-phase edge.

8. The electric drive control apparatus according to claim 6, further comprising:
an electric motor having a rotor and a stator, wherein
the magnetic pole position detecting portion has a sensor rotor attached to the rotor, and a sensor stator that is adjacent to the stator, that is fixed to a case, and that extends over a partial region of the sensor rotor extending in a circumferential direction.

9. An electric drive control method, comprising:
generating a plurality of detection signals of different frequencies based on a sensor output of the magnetic pole position detecting portion;
computing an electric machine rotation speed based on the plurality of detection signals;
performing phase switching for the plurality of detection signals of different frequencies for a magnetic pole position based on the electric machine rotation speed and a phase switch rotation speed; and
computing the magnetic pole position based on a detection signal switched.

10. A control method used by electric drive control apparatus, having a magnetic pole position detecting portion, comprising:
generating a plurality of detection signals of different frequencies based on an output of the magnetic pole position detecting portion;
computing an electric machine rotation speed based on the plurality of detection signals;
performing phase switching for the plurality of detection signals of different frequencies for a magnetic pole position based on the electric machine rotation speed and a phase switch rotation speed;
computing the magnetic pole position based on detection signal switched; and
computing an electric machine acceleration based on the electric machine rotation speed, wherein the phase switch rotation speed is set corresponding to the electric machine acceleration.

11. The method according to claim 10, further comprising switching a clock for switching a resolving power based on the electric machine rotation speed, wherein the phase switching is performed in conjunction with switching of the clock.

12. The method according to claim 10, further comprising:
determining whether the magnetic pole position is within a predetermined range; and
prohibiting detection of an edge in the detection signal if the magnetic pole position is within the predetermined range.

13. The method according to claim 10, wherein the plurality of detection signals of different frequencies includes an A-phase signal, a B-phase, and a Z-phase signal, and the phase switching is between an AB phase and a Z phase.

* * * * *